(12) United States Patent
Michael et al.

(10) Patent No.: US 9,128,822 B2
(45) Date of Patent: Sep. 8, 2015

(54) ON-CHIP BAD BLOCK MANAGEMENT FOR NAND FLASH MEMORY

(75) Inventors: Oron Michael, San Jose, CA (US);
Robin John Jigour, San Jose, CA (US);
Anil Gupta, Saratoga, CA (US)

(73) Assignee: WINBOND ELECTRONICS CORPORATION, Taichung (TW)

( * ) Notice: Subject to any disclaimer, the term of this patent is extended or adjusted under 35 U.S.C. 154(b) by 98 days.

(21) Appl. No.: 13/530,518

(22) Filed: Jun. 22, 2012

(65) Prior Publication Data

US 2013/0346671 A1 Dec. 26, 2013

(51) Int. Cl.
*G06F 12/02* (2006.01)
*G06F 3/06* (2006.01)

(52) U.S. Cl.
CPC .......... *G06F 12/0246* (2013.01); *G06F 3/0679* (2013.01); *G06F 2212/7201* (2013.01)

(58) Field of Classification Search
CPC ............................. G06F 12/02; G06F 12/0246
USPC ...................................................... 711/1–200
See application file for complete search history.

(56) References Cited

U.S. PATENT DOCUMENTS

| | | | |
|---|---|---|---|
| 7,171,536 B2 * | 1/2007 | Chang et al. ................... | 711/170 |
| 7,558,900 B2 | 7/2009 | Jigour et al. | |
| 8,667,368 B2 | 3/2014 | Gupta et al. | |
| 2003/0002366 A1 | 1/2003 | Mizoguchi et al. | |
| 2008/0313389 A1 * | 12/2008 | Chow et al. ................... | 711/103 |
| 2009/0019215 A1 * | 1/2009 | Lee et al. ....................... | 711/103 |
| 2009/0150588 A1 * | 6/2009 | Wang et al. .................... | 710/110 |
| 2009/0271567 A1 | 10/2009 | Huang | |
| 2010/0142275 A1 * | 6/2010 | Yogev et al. .............. | 365/185.09 |
| 2011/0041039 A1 | 2/2011 | Harari et al. | |
| 2011/0238898 A1 | 9/2011 | Honda | |
| 2012/0075931 A1 * | 3/2012 | Yuh .......................... | 365/185.17 |
| 2013/0138879 A1 * | 5/2013 | Kulkarni ....................... | 711/114 |
| 2013/0339634 A1 * | 12/2013 | Zhang et al. .................. | 711/154 |

FOREIGN PATENT DOCUMENTS

| | | |
|---|---|---|
| CN | 1902599 A | 1/2007 |
| JP | 2003-085054 | 3/2003 |
| JP | 2011-221996 | 11/2011 |

(Continued)

OTHER PUBLICATIONS

Cooke, J., On-die ECC NAND, Micron Technologies, Inc. slides 25-1 and 25-2, 2009, [online] [retrieved on Oct. 5, 2012]. Retrieved from the Internet:<URL:http://extmedia.micron.com/webmedia/ondieecc/ondieecc.html>.

(Continued)

*Primary Examiner* — Cheng-Yuan Tseng
*Assistant Examiner* — Zubair Ahmed
(74) *Attorney, Agent, or Firm* — David H. Carroll

(57) ABSTRACT

Certain functions relating to creation and use of a look-up table for bad block mapping may be implemented "on chip" in the memory device itself, that is on the same die in an additional circuit, or even within the command and control logic of the memory device, so as to reduce the overhead. Moreover, the on-chip implementation of the look-up table may be tightly integrated with other functions of the command and control logic to enable powerful new commands for NAND flash memory, such as a continuous read command and variations thereof.

6 Claims, 14 Drawing Sheets

(56) References Cited

FOREIGN PATENT DOCUMENTS

| TW | I351604 | 11/2011 |
| WO | 2005066790 A1 | 7/2005 |

OTHER PUBLICATIONS

Gupta, A. et al., Method and Apparatus for Reading NAND Flash Memory, U.S. Appl. No. 13/464,535, May 4, 2012, 49 pages.
Micron Technology, Inc., NAND Flash Memory, MT29F2G08AABWP, MT29F2G16AABWP, MT29F4G08BABWP, MT29F4G16BABWP, MT29F8G08FABWP, 2004, 57 pages.
Micron Technology, Inc., Technical Note TN-29-01: NAND Flash Performance Increase Using the Micron Page Read Cache Mode Command, 2004, 10 pages.
Micron Technology, Inc., Technical Note TN-29-17: Design and Use Considerations for NAND Flash Memory, 2006, 8 pages.
Micron Technology, Inc., Technical Note TN-29-19: NAND Flash 101: An Introduction to NAND Flash and How to Design It in to Your Next Product, 2006, 27 pages.
Micron Technology, Inc., Technical Note TN-29-42: Wear-Leveling Techniques in NAND Flash Devices, 2008, 8 pages.
Micron Technology, Inc., Technical Note TN 29-59: Bad Block Management in NAND Flash Memory, 2011, 4 pages.
Winbond Electronics Corporation, W25Q64DW spiflash 1.8V 64M-Bit Serial Flash Memory with Dual/Quad SPI and QPI, Preliminary Revision C, Jan. 13, 2011, 82 pages.
Japanese Patent Office. Office Action: Japanese Patent Application No. 2013-055404, Feb. 12, 2014. 6 Pages.
Japanese Patent Office. Office Action: Japanese Patent Application No. 2013-055404, Feb. 12, 2014. 4 Pages. (New English Translation Only).
Japanese Patent Office. Office Action: Japanese Patent Application No. 2013-055404, Nov. 26, 2014. 6 Pages.
Taiwan Intellectual Property Office. Office Action: Taiwan Patent Application No. 101142414, Mar. 26, 2015. 37 Pages.
Winbond Electronics Corporation. Reply to Office Action: Japanese Patent Application No. 2013-55404, May 9, 2014. 18 Pages.
Winbond Electronics Corporation. Reply to Office Action: Taiwan Patent Application No. 101142414, May 29, 2015. 17 Pages.

\* cited by examiner

ON-CHIP BAD BLOCK MANAGEMENT FOR NAND FLASH MEMORY

BACKGROUND OF THE INVENTION

1. Field of the Invention

The present invention relates to digital memory devices, and more particularly to methods and apparatus for on-chip bad block management for NAND flash memory.

2. Description of Related Art

NAND flash memory has become increasingly popular due to its significant cost advantage. Moreover, NAND flash memory is now available in a variety of different interfaces, ranging from traditional NAND interfaces to low pin count Serial Peripheral Interfaces ("SPI").

NAND flash architecture organizes the memory array into blocks, each of which has a number of pages. Typical page sizes include 512 bytes, 2,048 bytes, and 4,096 bytes. A number of additional bytes are associated with each page, typically 16 bytes, 64 bytes, or 128 bytes, for storage of an error correcting code ("ECC") checksum and sometimes for metadata. Reading and programming are performed on a page basis, while erasure is performed on a block basis.

Bad block management is commonly performed on NAND flash memory. Such memory is susceptible to bad block conditions, including blocks having failed memory cells at the time of manufacture, and blocks developing failed memory cells due to degradation of the memory cells with repeated use. The bad block management typically is performed by the device driver software on the host operating system, or by a separate dedicated controller chip. When a "bad" logical block is accessed by high-level software, it is mapped to a "good" physical block by the device driver or controller using a bad block mapping table, typically referred to as a look-up table ("LUT"). The LUT function is a collection of links between a logical block address ("LBA") whose unmapped physical address is to a bad block, and a physical block address ("PBA") of a mapped good block.

Use of the LUT has been effective with some of the commands commonly available for standard NAND flash memory devices, such as the page read command. Some commands such as the sequential read command have been made compatible with LUT use by limiting the commands to sequential reads within a given block.

BRIEF SUMMARY OF THE INVENTION

One embodiment of the present invention is a method of accessing a NAND flash memory array having a user-addressable area and being implemented on a chip for reading, programming and erasing portions of the NAND flash memory array, comprising: identifying a logical block address for accessing the NAND flash memory array, the logical block address being complete for an erase access, and being supplemented by a page address portion for a read access and a programming access; obtaining on-chip with the NAND flash memory array a mapping of the logical block address to a physical block address of a replacement block in the user-addressable area; and accessing the NAND flash memory array using the physical block address of the replacement block.

Another embodiment of the present invention is a method of performing a continuous page read operation on a NAND flash memory chip having a NAND flash memory array and a page buffer comprising a data register and a cache register, comprising: maintaining a look up table register on-chip with the NAND flash memory array, the look up table register storing one or more logical bad block addresses and one or more physical replacement block addresses corresponding to the logical bad block addresses; outputting data from a plurality of portions of the cache register, seamlessly and in succession, the data register being organized in a plurality of portions corresponding to the portions of the cache register; establishing a logical page address for accessing the NAND flash memory array, the logical page address comprising a logical block address portion; searching within the logical bad block addresses of the look up table register for a match between one of the logical bad block addresses and the logical block address portion; while outputting data from a first one of the cache register portions, transferring data to a second one of the cache register portions different than the first cache register portion from the corresponding portion of the data register; while outputting data from the first cache register portion and after the transferring step, performing an ECC computation on the second cache register portion; while outputting data from the first cache register portion and after the transferring step, reading a page of data from the NAND flash memory array into the data register using the logical page address when the match is absent from the searching step, and using one of the physical replacement block addresses which corresponds to the one of the logical bad block addresses that matches the logical block address portion when the match is present in the searching step; and while outputting data from the second cache register portion, transferring data to one of the cache register portions other than the second cache register portion from the corresponding portion of the data register and performing an ECC computation thereon.

Another embodiment of the present invention is a method of performing a page read operation on a NAND flash memory chip having a NAND flash memory array and a page buffer comprising a data register and a cache register, comprising: maintaining a look up table register on-chip with the NAND flash memory array, the look up table register storing one or more logical bad block addresses and one or more physical replacement block addresses corresponding to the logical bad block addresses; establishing a logical page address for accessing the NAND flash memory array, the logical page address comprising a logical block address portion; searching within the logical bad block addresses of the look up table register for a match between one of the logical bad block addresses and the logical block address portion; reading a page of data from the NAND flash memory array into the page buffer using one of the physical replacement block addresses which corresponds to the one of the logical bad block addresses that matches the logical block address portion in the searching step; and performing an ECC computation on the page buffer.

Another embodiment of the present invention is a method of performing a continuous page read operation on a NAND flash memory chip having a NAND flash memory array and a page buffer, comprising: maintaining a look up table register on-chip with the NAND flash memory array, the look up table register storing one or more logical bad block addresses and one or more physical replacement block addresses corresponding to the logical bad block addresses; establishing a logical page address for accessing the NAND flash memory array, the logical page address comprising a logical block address portion; searching within the logical bad block addresses of the look up table register for a match between one of the logical bad block addresses and the logical block address portion; reading a page of data from the NAND flash memory array into the page buffer using the logical page address when the match is absent from the searching step, and using one of the physical replacement block addresses which corresponds to the one of the logical bad block addresses that matches the logical block address portion when the match is present in the searching step; performing an ECC computation on the page of data in the page buffer; and when the ECC computation in the performing step indicates an uncorrectable page read error, updating a continuous page read bad block address register using the logical page address when the match is absent from the searching step, and using one of the physical replacement block addresses which corresponds to the one of the logical bad block addresses that matches the logical block address portion when the match is present in the searching step.

Another embodiment of the present invention is a NAND flash memory chip comprising: a NAND flash memory array; a row decoder coupled to the NAND flash memory array; a page buffer coupled to the NAND flash memory array; a column decoder coupled to the page buffer; an I/O control circuit coupled to the column decoder; a status register coupled to the I/O controller; a continuous page read bad block address register coupled to the I/O controller; a command register coupled to the I/O controller; an address register coupled to the I/O controller; a look up table register coupled to the I/O controller; and a control logic circuit coupled to the row decoder, the column decoder, the page buffer, the status register, the continuous page read bad block address register; the command register; the address register; and the look up table register.

Another embodiment of the present invention is a method of bad block management for a NAND flash memory array implemented on a chip, comprising: maintaining a look up table register on-chip with the NAND flash memory array; detecting a first bad block during a user access of the NAND flash memory array using a logical block address of the first bad block; and accessing the on-chip look up table register to store a mapping of the logical block address of the first bad block to a physical block address of a first replacement block in the NAND flash memory array.

Another embodiment of the present invention is a method of accessing a NAND flash memory array implemented on a chip for reading, programming and erasing portions of the NAND flash memory array, comprising: identifying a logical block address for accessing the NAND flash memory array, the logical block address being complete for an erase access, and being supplemented by a page address portion for a read access and a programming access; obtaining from a look up table on-chip with the NAND flash memory array a mapping of the logical block address to a corresponding physical block address of a replacement block, the look up table being accessible to a user while the NAND flash memory array is in service for standard read, program and erase operations for storing mappings of logical block addresses of bad blocks to physical block addresses of replacement blocks; and accessing the NAND flash memory array using the corresponding physical block address of the replacement block.

DETAILED DESCRIPTION OF THE INVENTION, INCLUDING THE BEST MODE

Using a host device or an outside controller to implement the bad block Look-Up Table ("LUT") in software or hardware adds overhead in software development and possibly hardware cost. However, certain functions relating to creation and use of the LUT may be implemented "on chip" in the memory device itself, that is on the same die in an additional circuit, or even within the command and control logic of the memory device, so as to reduce the overhead. Moreover, the on-chip implementation of the LUT may be tightly integrated with other functions of the command and control logic to enable powerful new commands for NAND flash memory, such as a continuous read command and variations thereof.

Figure 1:
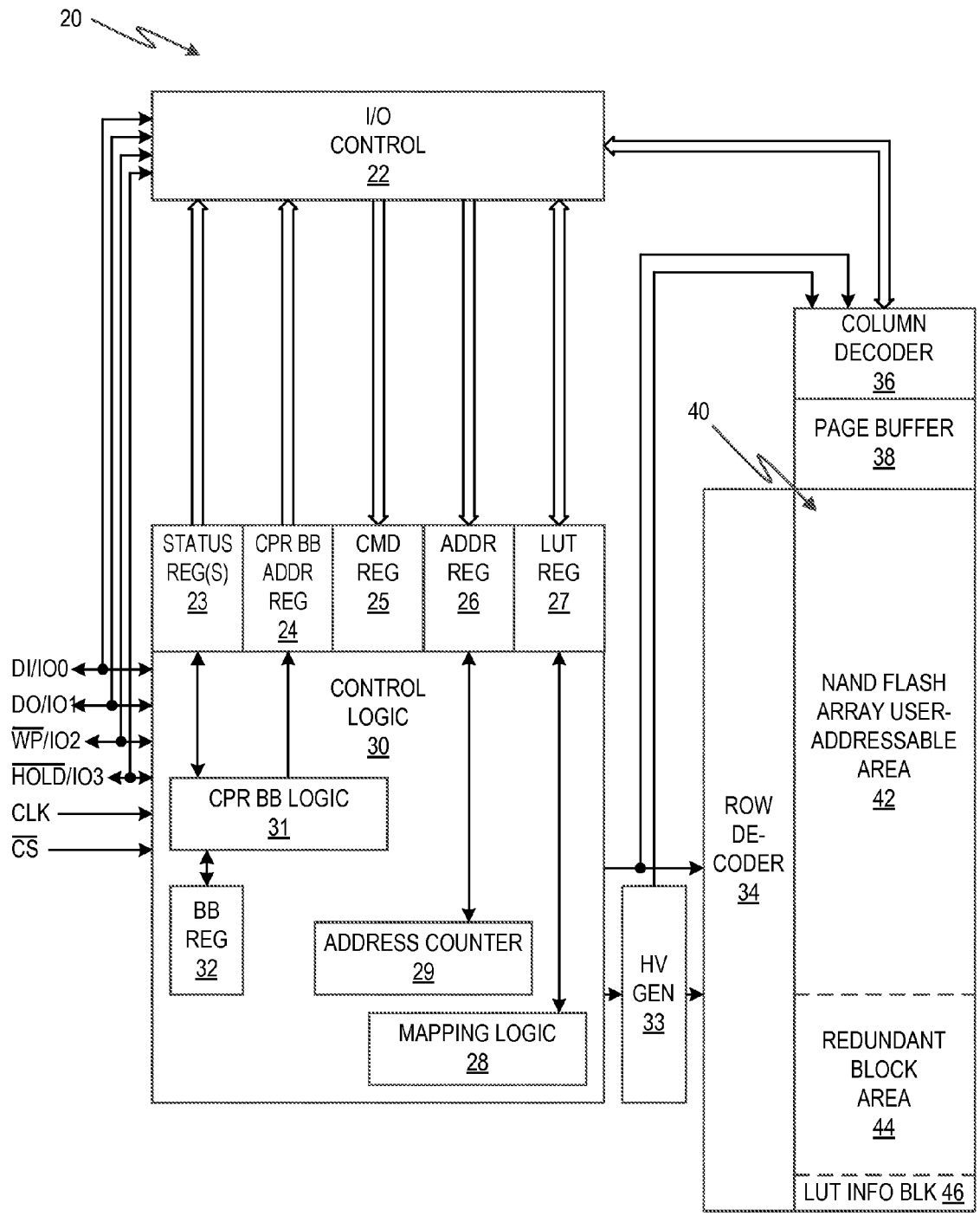
FIG. 1 is a schematic functional block diagram of a NAND flash memory device.

FIG. 1 is a schematic functional block diagram of a NAND flash memory device 20 which includes a NAND flash array 40 and associated page buffer 38. The NAND flash array 40 includes word (row) lines and bit (column) lines, and is organized into a user-addressable area 42, a redundant block area 44, and a LUT information block 46. Any desired flash memory cell technology may be used for the flash memory cells of the NAND flash array 40. The NAND flash memory device 20 may include various other circuits to support memory programming, erase and read, such as row decoder 34, column decoder 36, I/O control 22, status register(s) 23, continuous page read ("CPR") address register(s) 24, command register 25, address register 26, a LUT register 27, control logic 30, CPR bad block logic 31, a CPR bad block register 32, and high voltage generators 33. The row decoder 34 selects rows of the user-addressable area 42 under user control as well as, in some implementations, under internal control, and selects rows of the redundant block area 44 and LUT information block 46 under internal control. While the NAND flash memory device 20 may be packaged in any desired manner and may have any type of interface, including conventional NAND flash memory device interfaces, the control logic 30 of FIG. 1 illustratively implements the SPI and QPI protocols, including the multi-10 SPI interface. Additional detail on QPI and the SPI interface and on the circuits related to the memory arrays may be found in U.S. Pat. No. 7,558,900 issued Jul. 7, 2009 to Jigour et al., and in a publication by Winbond Electronics Corporation, W25Q64DW: SpiFlash 1.8V 64M-Bit Serial Flash Memory with Dual/Quad SPI & QPI: Preliminary Revision C, Hsinchu, Taiwan, R.O.C., Jan. 13, 2011, which hereby are incorporated herein in their entirety by reference thereto.

The page buffer 38 illustratively includes a one-page data register (not shown), a one-page cache register (not shown), and one page of transmission gates (not shown) for copying data from the data register to the cache register. Any suitable latch or memory technology may be used for the data register and the cache register; illustratively a latch may be implemented as back-to-back connected inverters. Any suitable gating technology may be used for the transmission gates; illustratively a transmission gate may be implemented as a CMOS transmission gate. The data register and the cache register may be organized in any desired number of respective portions by, for example, the manner in which the transmission gates are wired and operated to control transmission of data. Illustratively, the data register and the cache register may be organized in respective portions and operated in alternation by using respective groups of transmission gates controlled by respective control lines. The data register and the cache register of the page buffer 38 may be operated in a conventional manner by applying the same control signal to respective transmission gate control lines, or may be operated in alternation by applying suitable timed control signals to the transmission gate control lines. Illustratively in a two portion implementation in which a page is 2K Bytes, a half-page (1 K) of transmission gates may be controlled by one control line and the other half-page (1 K) of transmission gates may be controlled by another control line, thereby organizing the data register and the cache register in two half-page (1 K) portions. Because of the operation of two portions in alternation, a two-portion implementation of the page buffer 38 may be referred to as a "ping pong" buffer. An ECC circuit (not show) may be provided to perform ECC computations on the contents of the cache register. Additional detail on the page buffer 38, the ECC circuit, and their operations may be found in U.S. Pat. No. 8,667,368 issued Mar. 4, 2014 (Gupta et al., Method and Apparatus for Reading NAND Flash Memory), which hereby is incorporated herein in its entirety by reference thereto. This manner of organizing the data register and cache register into portions and performing ECC on the portions is illustrative, and other techniques may be used if desired.

While the NAND flash memory device 20 is organized and operated to perform a variety of read operations including continuous page read operations and on-chip ECC in a single-plane NAND Architecture, this architecture is illustrative and variations thereof are contemplated. While the example of a 2 KB Page size is used throughout this document, it will be appreciated that the page and block sizes are illustrative and may be different if desired. The page in a NAND Flash specifies the granularity for programming (e.g. 2K Bytes), and the block in NAND flash specifies granularity for erasing (e.g. 128K Bytes). The page also specifies granularity for reading data in standard NAND flash. Moreover, the specific size reference is not to be taken literally, since the actual page size may vary depending on design factors; for example, the term may include a 2,048 Byte main area plus an additional 64 Byte spare area, where the spare area is used for storing ECC and other information such as meta data. In the same way, the term 1 KB may refer to a 1,024 Byte main area and a 32 Byte spare area. While the description herein is based upon a single-plane architecture for clarity, the teachings set forth herein are equally applicable to multi-plane architectures. A plane is the smallest unit that serves an I/O request in a parallel fashion. When multiple physical planes are used, they may share one or more word-lines so that the memory system may service multiple I/O requests simultaneously. Each plane provides a page of data and includes a corresponding data register of one page size and a corresponding cache register of one page size. The techniques described herein may be applied to each plane separately such that each data register and cache register is organized in multiple portions, or may be applied to multiple planes such that each data register and cache register is itself one portion of a multiple page data register and cache register.

FIG. 1 also shows control signals CS/, CLK, DI, DO, WP/, HOLD/ which are for the SPI interface. The standard SPI Flash interface provides CS/ (chip select—complement), CLK (clock), DI (serial data-in), and DO (serial data-out) signals, along with optional signals WP/ (write protect—complement) and HOLD/ (hold—complement). The significance of complement signal is only reversal of polarity, e.g. CS/ low state enables the SPI Flash chip. While the 1-bit serial data bus (data-in through DI and data-out through DO) in the standard SPI interface provides a simple interface, it is limited in achieving higher read thru-put. A multi-bit SPI interface therefore evolved to additionally support dual (2-bit interface) and/or quad (4-bit interface) for increased read thru-put. FIG. 1 also shows additional data bus signals for Dual SPI and Quad SPI operation, i.e. I/O(0), I/O(1), I/O(2), and I/O(3), by selectively redefining the function of four pins. In the Quad SPI read operation, the appropriate read command may be given with 1-bit standard SPI interface through I/O(0), but subsequent interface for address and data-out is Quad based (i.e. 4-bit data bus). In another version of Quad SPI, both read command and address may be given with 1-bit standard SPI interface through I/O(0), but subsequent interface for data-out is Quad based (i.e. 4-bit data bus). Optional dummy clock cycles may be used between providing address and reading out data. The Quad SPI read operation can output 4-bits of data in a clock cycle as compared to output 1-bit of data in standard SPI read operation, and therefore the Quad SPI read operation can provide four times higher read thru-put. While Quad SPI read operation is used herein for explanation, the teachings herein are equally applicable to the other modes of operation, including but not limited to standard SPI, Dual SPI, Quad Peripheral Interface ("QPI") and Double Transfer Rate ("DTR") read modes. In the QPI protocol, the complete interface (command, address, and data-out) is done on 4-bit basis. In the DTR protocol, the output data is provided on both low-going and high-going CLK edge, rather than providing output data only on low-going CLK edge as in Single Transfer Rate ("STR") read mode operation.

Bad Block Management

Figure 2:
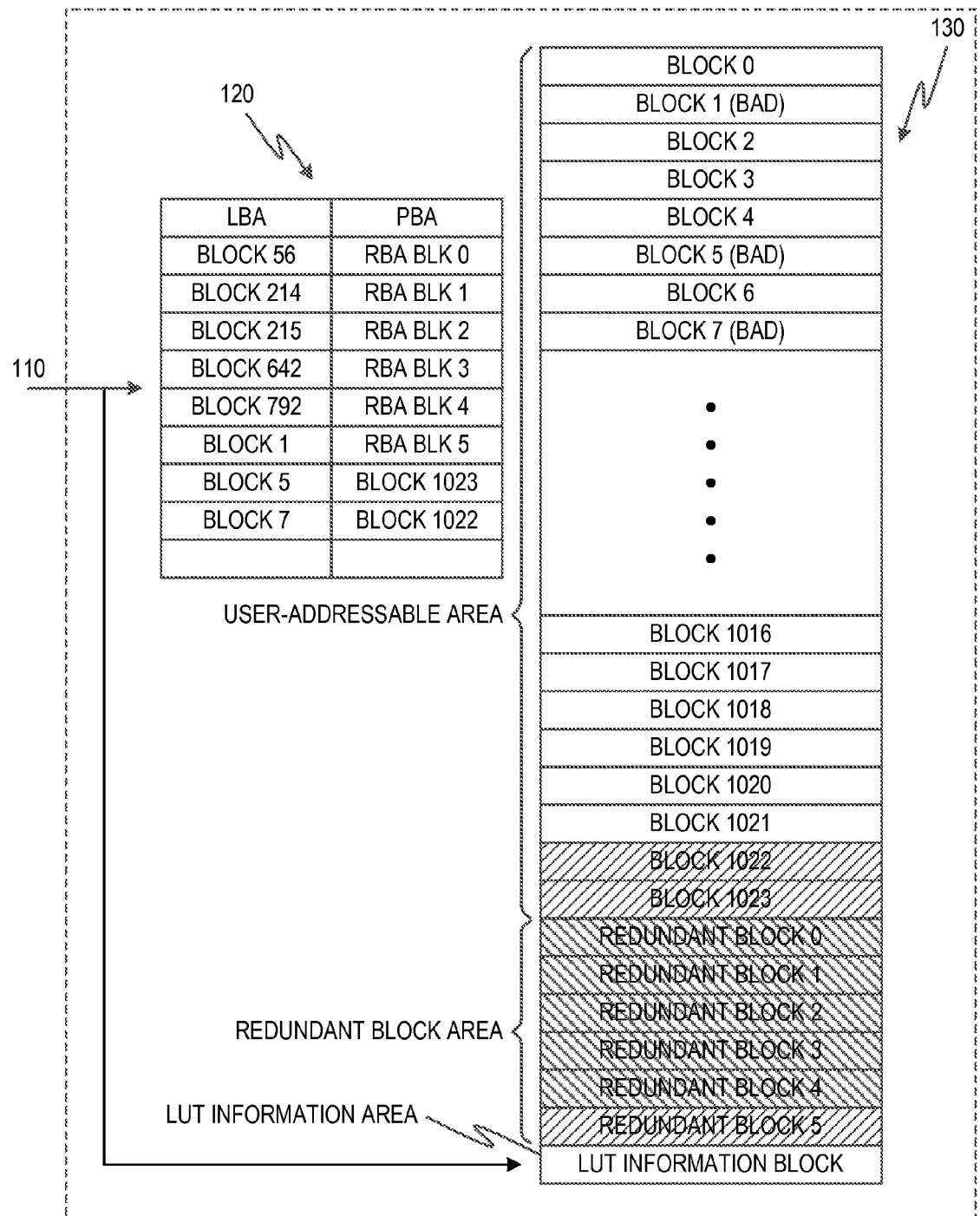
FIG. 2 is a schematic block diagram of the organization of a NAND flash memory array and an associated look-up table.

FIG. 2 is a schematic block diagram of an illustrative organization of a NAND flash memory array 130 and an associated look-up table 120. The NAND flash memory array 130 includes three areas, a user-addressable area, a redundant block area, and a LUT information area. The look-up table 120 contains a mapping from LBA's to PBA's for bad block management. In the illustrative FIG. 2 situation, simplified for clarity, a number of blocks found to be bad during the manufacture process are replaced by blocks in the redundant block area of the NAND flash memory array 130, namely block 56 (not shown) is replaced by redundant block area block 0, block 214 (not shown) is replaced by redundant block area block 1, block 215 (not shown) is replaced by redundant block area block 2, block 642 (not shown) is replaced by redundant block area block 3, and block 792 (not shown) is replaced by redundant block area block 4. As delivered by the manufacturer, therefore, the memory has one unused redundant block, redundant block 5, and contains a full 1024 blocks of addressable memory.

Although not shown in FIG. 2, it is possible for the manufacturer to use up all blocks in the redundant block area to replace bad blocks, and even use up some of the blocks in the user-addressable area to replace bad blocks. The techniques described herein are also useful in this situation.

Returning to FIG. 2, assume that while the memory is in service, block 1 fails, followed by block 5 and then block 7. The failed blocks are mapped to good blocks in the NAND flash memory array 130 so that the device may remain in service. Illustratively, bad blocks are mapped first to unused blocks in the redundant block area, and then to available blocks in the user-addressable area. While any desired mapping scheme may be used, mapping first to the redundant block area maintains full user-addressable memory capacity for as long as possible. As shown in FIG. 2, bad block 1 is mapped to redundant block 5, while bad block 5 is mapped to block 1023 in the user-addressable area, and bad block 7 is mapped to block 1022 in the user-addressable area.

To enable effective bad block management, the look-up table may be constructed in the look-up table ("LUT") register 27, which is directly accessible to the control logic 30 and the mapping logic 28. Illustratively, the LUT register 27 is implemented in a small and fast volatile memory such as SRAM memory. The size of the LUT register 27 is a matter of design choice based on a compromise of such factors as look-up table delay and the number of bad blocks for which replacements blocks may be assigned. Illustratively, the LUT register 27 may be designed to store address information for twenty mappings; that is, the LBA's of twenty bad blocks and the PBA's of twenty associated replacement blocks. The LUT register 27 may be populated at chip power-up by reading LBA and PBA data from the LUT information block of the NAND flash memory array 130. Another way to populate the LUT register 27 is to read the LBA and PBA data from the LUT information block of the NAND flash memory array 130 in response to a reset command. Where the bad blocks of the user-addressable area are marked as such, such as, for example, with non-FFh data in the first byte of the spare area for the first page, the blocks may be read to confirm the accuracy of the LBA list in the LUT 120.

Although the LUT register 27 is shown as one register, it may be implemented in any manner desired. In one illustrative implementation, the look-up table register may be implemented in two separate parts, one of which is user accessible and may contain mapping information related to user addressable area but not mapping information related to redundant block area, while the other may contain the mapping information related to redundant block area and is available for internal use by the NAND flash memory.

Figure 3:
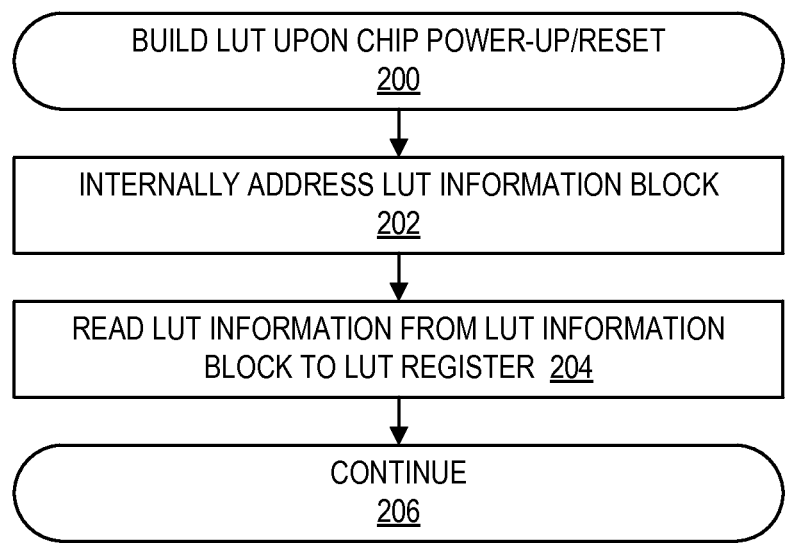
FIG. 3 is a flowchart of one approach for initializing a look-up table.

FIG. 3 shows an illustrative initiation process 200 for building a LUT upon chip power-up or reset. The address of the LUT information block, which is outside of the user-addressable area 42 of the NAND flash array 40 (FIG. 1), is available internally (block 202) and is used to read LUT information from the LUT information block 46 into the LUT register 27 for creating the LUT (block 204). The LUT register 27 is used in conjunction with mapping logic 28 (FIG. 1).

Applied to the example shown in FIG. 2, the initiation sequence may result in a LUT having LBA entries block 56, block 214, block 215, block 642, and block 792, and corresponding PBA entries RBA block 0, RBA block 1, RBA block 2, RBA block 3, and RBA block 4 (indicated by left-to-right downward crosshatching). This is because in this example, the manufacturer identifies blocks 56, 214, 215, 642 and 792 as being bad, maps them to redundant block area blocks 0, 1, 2, 3 and 4, and places that information into the LUT information block 46.

Figure 4:
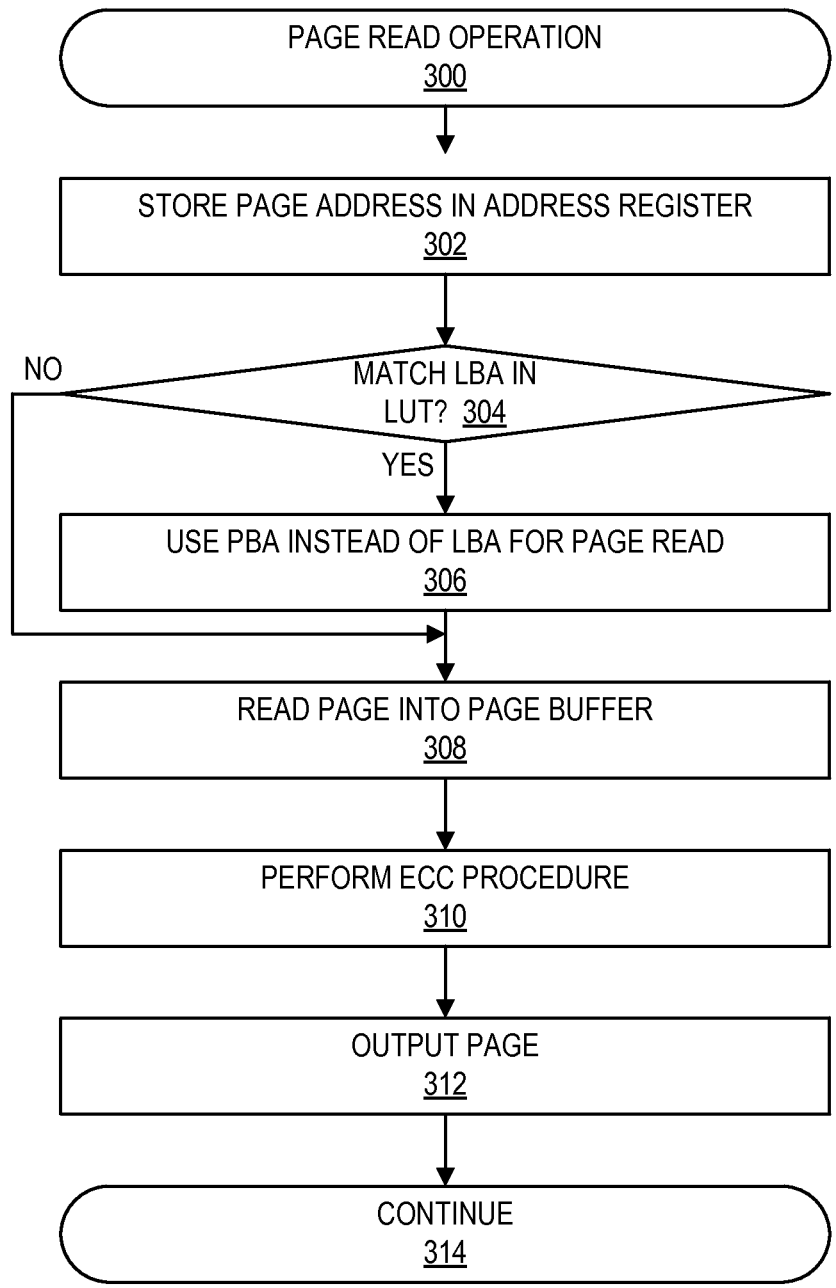
FIG. 4 is a flowchart of a page read operation with bad block mapping.
Figure 5:
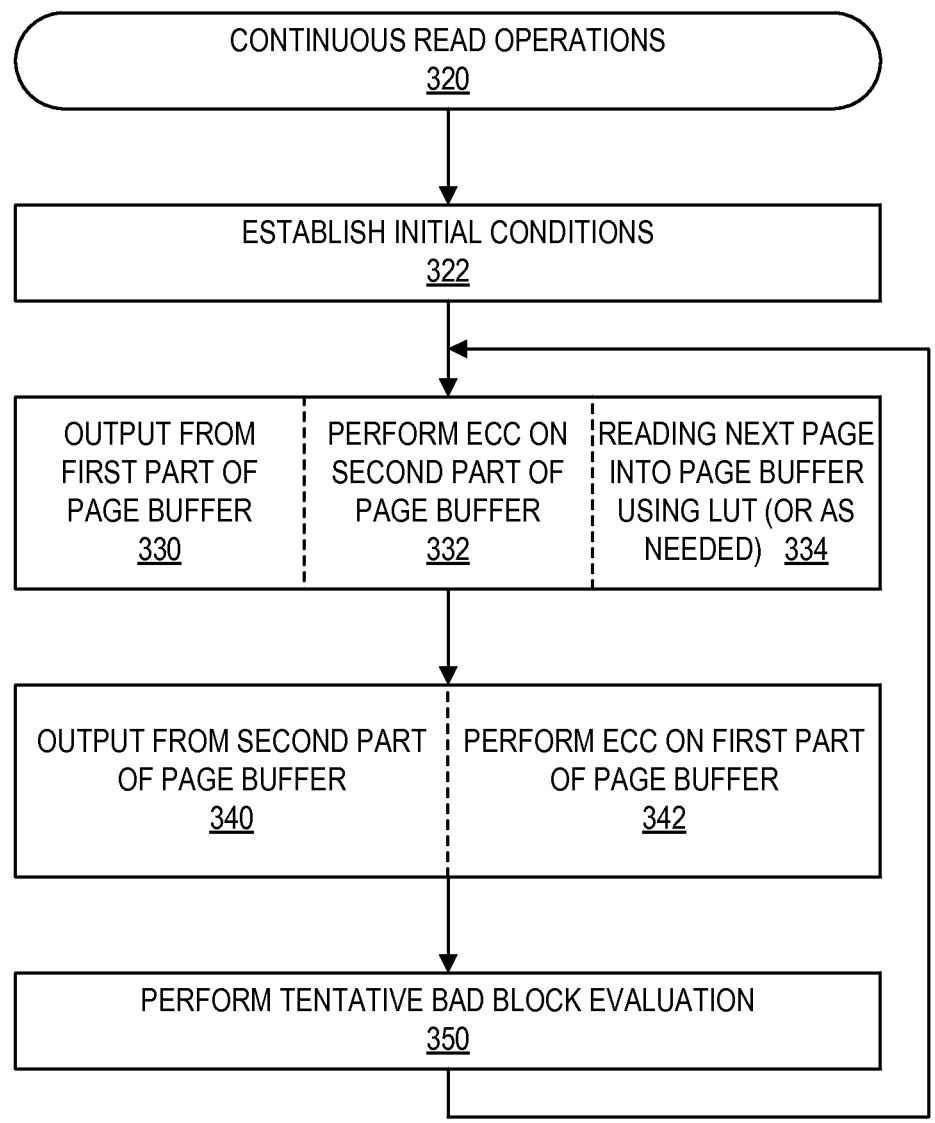
FIG. 5 is a flowchart of a continuous page read operation with bad block mapping.
Figure 6:
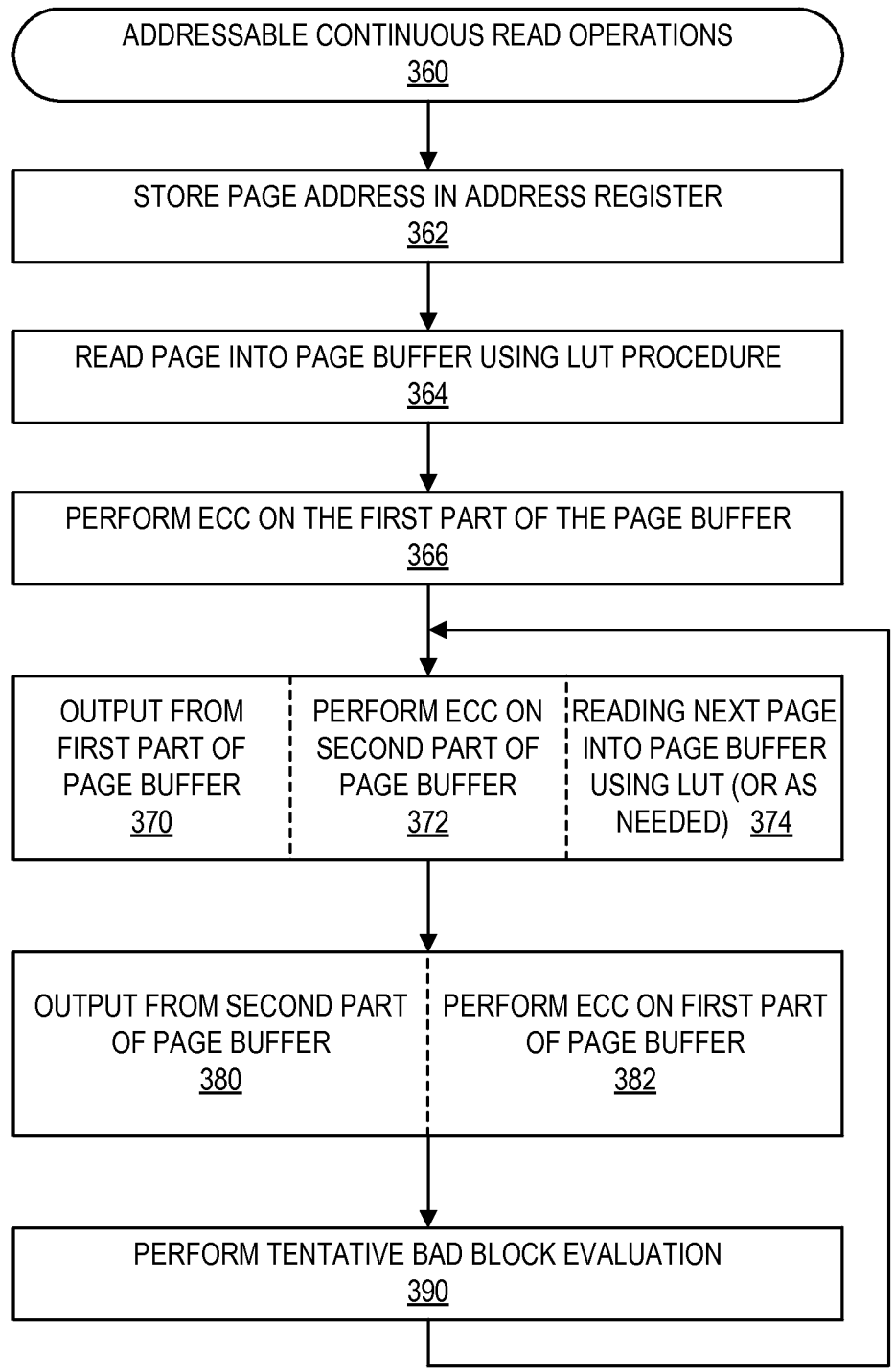
FIG. 6 is a flowchart of an addressable continuous page read operation with bad block mapping.

FIGS. 4, 5 and 6 show illustrative processes for three illustrative commands, respectively a page read command, a fast continuous page mode command, and an addressable continuous page mode command. These types of read commands may be but need not necessarily be implemented together in a particular NAND flash memory device. A page read command reads one page of memory with the address specified in the page address field of the command. A fast continuous page read command may follow a page read command, and reads pages out of memory continuously starting with the address specified in the page address field of the page read command. The fast continuous page read command does not include an address field. An addressable continuous page read command reads pages out of memory continuously starting with the address specified in the page address field of the command.

As shown in FIG. 4, when a page read command is received, the page address specified in the command is stored in the address register 26 (block 302). The page read process continues with replacement block processing, which involves searching in the LUT register 27 to determine whether the block address portion of the address in the address register 26 matches any of the LBA's in the LUT register 27 (block 304). This search may be performed quickly without significantly impacting read access time because the LUT register 27 may be a small and fast SRAM that is on-chip and therefore locally accessible by the control logic 30. If no match is found (block 304—no), the LBA is used to read a page into the buffer 38 (block 308). If a match is found, (block 304—yes), a replaced bad block is indicated and the PBA of the replacement block is used instead of the LBA in the address register 26 to read the desired page (block 306). When the desired page of data is read into the page buffer 38 (block 308), an ECC procedure is performed on the data and the resulting ECC bits in the status register(s) 23 are set as appropriate (block 310). The page is then output (block 312) and processing continues (block 314).

A basic continuous page read process 320 which is compatible with bad block mapping and which includes bad block management is shown in FIG. 5. The process is iterative after suitable initial conditions are established (block 322), which depend on how the basic continuous page read process 320 is being used. The continuous read process 320 may be used essentially as shown when suitable initial conditions are present in the NAND flash memory device. While suitable initial conditions may arise in different ways, one way is for the continuous read process 320 to follow a previous operation such as the execution of a command, in which case it may be referred to as a fast continuous page read or "FCPR" because execution begins without any latency except for decoding of the fast continuous page read command. The page read command of FIG. 4, for example, may be used to establish the initial conditions when terminated without outputting page data (block 312). This leaves the starting address (the process 320 may be modified to accommodate addresses other than the starting address) in the address register and ECC processed data in the page buffer as the initial conditions (block 322).

Three essentially concurrent operations may then take place, namely that a first part of the page buffer is output (block 330), ECC calculations are performed on a second part of the page buffer (block 332), and the next page of data is read into the page buffer (block 334) using a suitable look-up table procedure for bad blocks such as, for example, blocks 304 and 306 (FIG. 4). The next page of data may be accessed by incrementing the address in the address register 26 with the on-chip address counter 29 (FIG. 1), and then performing replacement block processing using, for example, essentially the replacement block processing shown in FIG. 4 (see, e.g., blocks 304 and 306). Replacement block processing need only be performed at the time of the first page access and at each block boundary, although to avoid additional circuit complexity to detect such occurrences, replacement block processing may be performed at each page access without harm. While performing ECC calculations on the second part of the page buffer (block 332) is redundant during the first iteration of the continuous read following a page read, it does no harm. If desired, the continuous read operation may be modified to bypass performing ECC calculations on the second part of the page buffer (block 332) during the first iteration.

Next, two essentially concurrent operations may then occur, namely that the second part of the page buffer is output (block 340), and ECC calculations are performed on the first part of the page buffer (block 342). Since a full page of data is now output and the ECC bits in the status register(s) 23 is now set, a tentative bad block evaluation may be performed (block 350). Note that a page read need not be done at this time. However, if desired, a partial page read may be done instead of a full page read in the previous operation (block 334), and a partial page read may be done essentially concurrently with output from the second part of the page buffer (block 340) and ECC calculations are performed on the first part of the page buffer (block 342).

The next successive page may be read and output by re-executing the process beginning with blocks 330, 332 and 334. The continuous read continues until terminated in any desired manner, such as by discontinuing the clock and chip select signals, for example.

A tentative bad block evaluation (block 350) may be performed in the following illustrative manner. The evaluation may be performed by the CPR bad block logic 31 along with the bad block register 32 and ECC bits in the status register(s) 23. While any convention is suitable, one suitable convention uses two ECC bits to represent no continuous page read errors (00), one or more corrected continuous page read errors (01), one uncorrectable continuous page read error (10), and more than one uncorrectable continuous page read errors (11). The bad block register 32 may be of any suitable type and size to maintain the desired information, illustratively a two bit register to keep track of no continuous page read errors (00), one or more corrected continuous page read errors (01), one uncorrectable continuous page read error (10), and more than one uncorrectable continuous page read errors (11). When the ECC calculation is complete on a full page of data in the page buffer 38, the ECC circuit (not shown) writes the result, which may be no error (00), a corrected error (01), or an uncorrectable error (10), into the ECC bits of the status register(s) 23. The CPR bad block logic 31 inspects the ECC bits in status register(s) 23, adjusts the value stored in the bad block register 32 as appropriate, and writes the page address into the CPR bad block address register 24 if the ECC bits indicate an uncorrectable error (10). The CPR bad block logic 31 then writes the appropriate value into ECC bits of the status register(s) 23 depending on the value of the bad block register 32, overwriting the value written into the ECC bits of the status register(s) 23 by the ECC circuit. The bad block register 32 may or may not be readable by the user, depending on design. Should the continuous read operation 320 be terminated at this point in the process, the user may read the status register (s) 23 to learn whether no continuous page read errors (00), one or more corrected continuous page read errors (01), one uncorrectable continuous page read error (10), or more than one uncorrectable continuous page read errors (11) has occurred, and may read the CPR bad block address register 24 for the tentatively identified bad block(s). If the continuous page read bad block address register 24 is only large enough to hold one block address, any prior block address is overwritten and the continuous page read bad block address register 24 contains the address of the last tentatively identified bad block. If the continuous page read address register 24 is large enough to hold several block addresses, the new bad block may be added without overwriting prior block addresses, up to the capacity of the register.

An addressable continuous page read ("ACPR") process 360 which is compatible with bad block mapping and which includes bad block management is shown in FIG. 6. The ACPR process 360 incorporates the continuous page read process 320 (FIG. 5), and as the ACPR process 360, is iterative after initial conditions are established. In the case of the addressable continuous page read, the initial conditions include the start address, which is provided in the command. The start address is stored in the address register 26 (block 362), and the page of data is read into the page buffer (block 364) using a suitable look-up table procedure for bad blocks such as, for example, blocks 304 and 306 (FIG. 4). Next, ECC calculations are performed on the first part of the page buffer (block 366). Thereafter, the process continues in an iterative manner as shown by blocks 370, 372, 374, 380, 382 and 390, which correspond with blocks 330, 332, 334, 340, 342 and 350 of FIG. 5.

Figure 7:
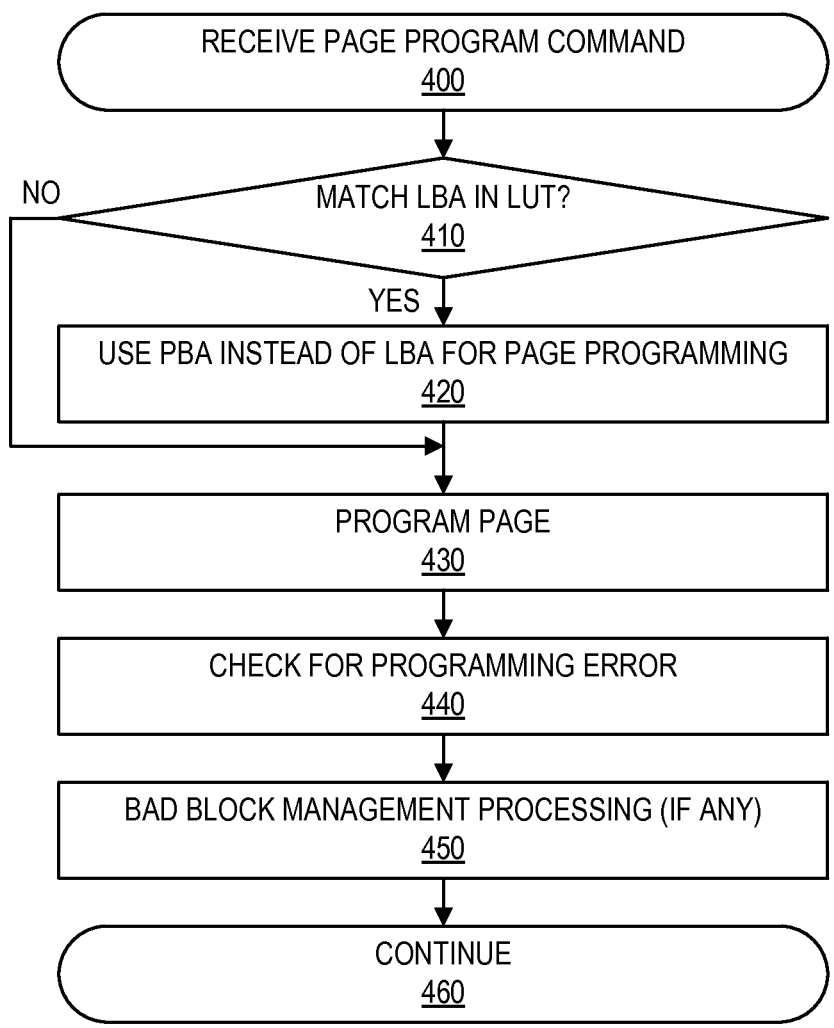
FIG. 7 is a flowchart of a program operation with bad block mapping.

FIG. 7 shows an illustrative programming process, which is initiated by receipt of a page program command (block 400). A page program command includes a page address field, from which the address of the page to be programmed is acquired and placed in the address register 26. The programming process continues by searching in the LUT register 27 to determine whether the address in the address register 26 matches any of the LBA's in the LUT register 27 (block 410). This search may be performed quickly without significantly impacting programming time because the LUT register 27 may be a fast SRAM that is locally accessible by the control logic 30. If no match is found (block 410—no), the LBA is used to program a page of memory (block 430). If a match is found (block 410—yes), a bad block is indicated and the PBA of the replacement block is used instead of the LBA in the address register 26 (block 420) to program the desired page (block 430). Once the correct page address is obtained, the actual page programming process (block 430) and the process of checking for a programming error (block 440) may be performed in any desired manner. An example of a suitable technique is the conventional program-verify operation, which typically sets a pass/fail bit in the status register. After checking for a programming error, bad block management may be performed if desired (block 450) (see FIG. 9). Bad block management may be performed in various ways, such as, for example, under user control by the host or controller, semi-automatically in response to bad block marking by the host or controller, automatically by the control logic of the NAND flash memory device, or in any other suitable manner, Once any bad block management is complete, other memory operations may continue (block 460).

Figure 8:
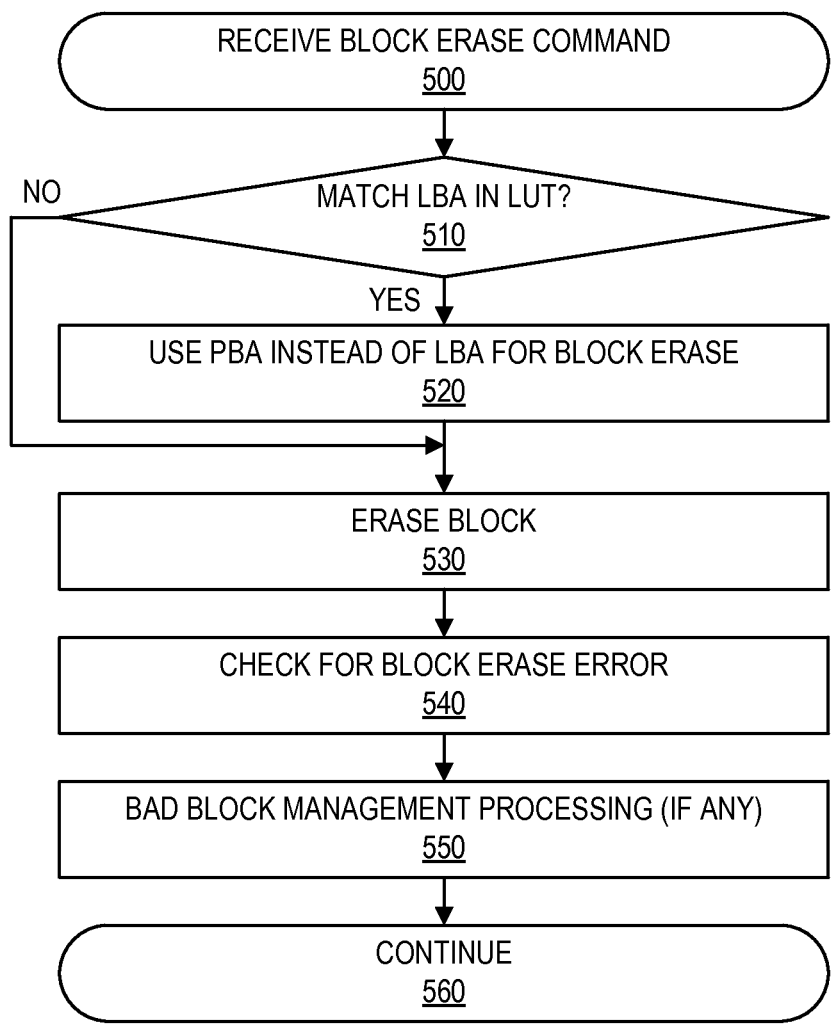
FIG. 8 is a flowchart of an erase operation with bad block mapping.

FIG. 8 shows an illustrative block erase process, which is initiated by receipt of a block erase command (block 500). A block erase command includes a block address field, from which the address of the block to be erased is acquired and placed in the address register 26. The block erase process continues by searching in the LUT register 27 to determine whether the address in the address register 26 matches any of the LBA's in the LUT register 27 (block 510). This search may be performed quickly without significantly impacting erase time because the LUT register 27 may be a fast SRAM that is locally accessible by the control logic 30. If no match is found (block 510—no), the LBA is used for the block erase (block 530). If a match is found (block 510—yes), a bad block is indicated and the PBA of the replacement block is used instead of the LBA in the address register 26 (block 520) for the block erase (block 530). Once the correct block address is obtained, the actual block erase process (block 530) and the process of checking for an erase error (block 540) may be performed in any desired manner. An example of a suitable technique is the conventional erase-verify operation, which typically sets a pass/fail bit in the status register. After checking for an erase error, bad block management may be performed if desired (block 550) (see FIG. 9). Bad block management may be performed in various ways, such as, for example, under user control by the host or controller, semi-automatically in response to bad block marking by the host or controller, automatically by the control logic of the NAND flash memory device, or in any other suitable manner, Once any bad block management is complete, other memory operations may continue (block 560).

Figure 9:
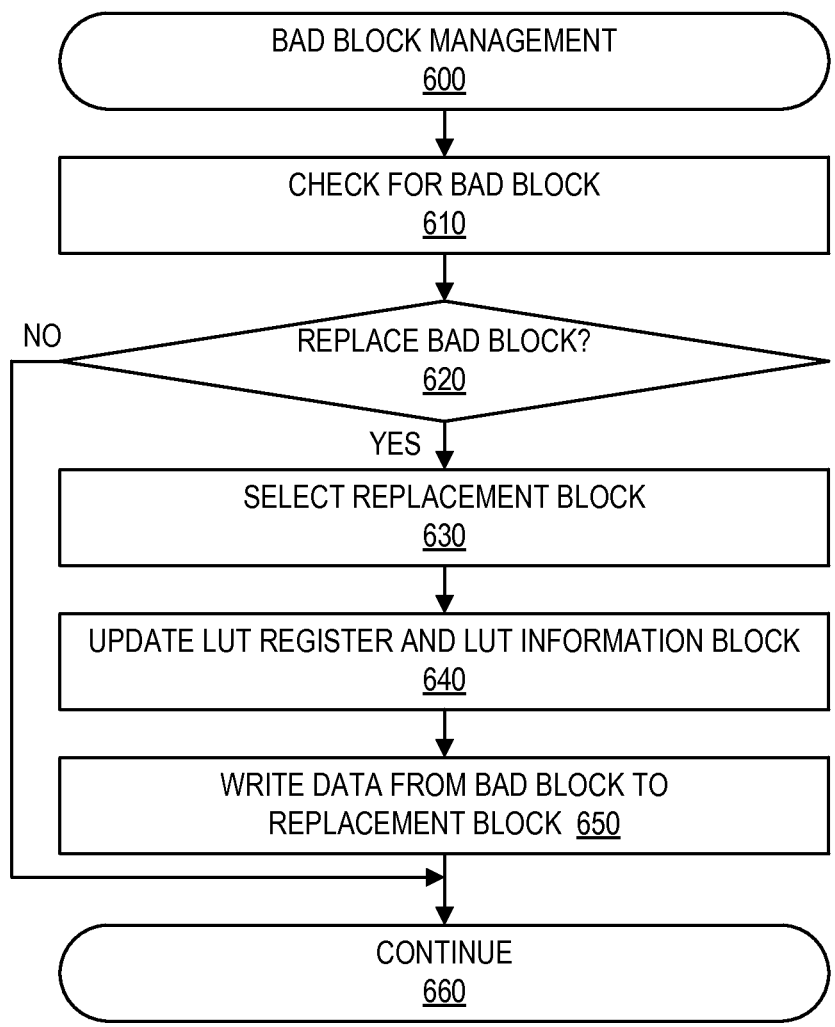
FIG. 9 is a flowchart of a bad block management technique.

FIG. 9 shows an illustrative process for assigning replacement blocks, which may be performed in various ways, including, for example, under user control by the host or controller, semi-automatically in response to bad block marking by the host or controller, and automatically by the control logic of the NAND flash memory device.

User-controlled bad block management begins by checking for a bad block (block 610) and deciding whether to replace the bad block (block 620). For an illustrative user-controlled process or an illustrative semi-automatic process, the bad block checking and the decision of whether to replace a bad block are done under user control by the host or controller. For an illustrative automatic process, the bad block checking and the decision of whether to replace a bad block are done by the control logic of the NAND flash memory device using various procedures and rules implemented in the logic. For a read operation, the ECC bits in the status register are read (for the illustrative user-controlled process and the illustrative semi-automatic process) or are inspected (for the illustrative automatic process) and the decision is made based on their value. Illustrative possible outcomes include no error, corrected error, uncorrectable error, and multiple uncorrectable errors (for a continuous page read). Where multiple bit correction is performed, a further option may include the number of bits corrected, or simply an indication that the maximum number of bits has been corrected. Illustrative responsive actions includes no action in instances of no error and corrected error (up to the maximum number of correctable bits or some lesser threshold), block replacement in instances of a corrected error where the maximum number of bits or some lesser threshold have been corrected, and read repeat in instances of an uncorrectable error followed by block replacement if a read repeat is successful. For page program and block erase operations, the status register is read (for the illustrative user-controlled process and the illustrative semi-automatic process) or the status register is inspected (for the illustrative automatic process) and the decision is made based on the pass-fail bit or bits in the status register. Illustrative responsive actions includes no action where the status register indicates "pass," repeat programming or erase where the status register indicates "fail," and block replacement with repeat programming or erase if the status register indicates "fail."

Although the continuous page read operations are intended to output a great many pages under normal conditions, the occurrence of multiple bad blocks during a single continuous page read operation is expected to be rare. Therefore, the continuous page read bad block address register 24 need have only a single page address capacity, although a multiple address capacity may be provided if desired. For the continuous page read operation, checking for a bad block (block 610) and deciding whether to replace the bad block (block 620) involves an inspection of the ECC bits. The continuous page read operation may be repeated with the replacement block, if desired. In the unlikely event that a further bad block is tentatively identified, bad block management is merely repeated.

If a bad block is to be replaced (block 620—yes), a replacement block is selected (block 630). For the illustrative user-controlled process, the user issues a suitable command to cause the mapping of the LBA of the bad block to the PBA of a replacement block. One suitable type of command is an address mapping command, for which the user decides on the PBA of a replacement block in the user-addressable area 42, and specifies the LBA of the bad block and the PBA of the selected replacement block. Another suitable type of command is the bad block marking command itself. For the illustrative semi-automatic process and the illustrative automatic process, the control logic may select the replacement block in response to any suitable command. While a dedicated command may be used, replacement block selection may be initiated by other types of commands. Illustrative, the bad block marking command commonly used in the art may be adapted to initiate replacement block selection. While the need for conventional bad block marking is superseded by use of the LUT information block 46 (FIG. 1), leaving the commands intact in legacy systems may do no harm. However, the command may be modified to additionally cause mapping of the LBA of the bad block to an available block in the redundant block area 44, thereby eliminating the need for the user to decide on the PBA of a replacement block provided that a block from the redundant block area 44 is available. The replacement block may be selected from just the redundant block area 44 of the NAND flash array 40, or from either the redundant block area 44 or the user-addressable area 42 of the NAND flash array 40, since the control logic of the NAND flash memory device has access to both areas. While any desired technique may be used to identify the next available replacement block, illustratively a replacement block address register (not shown) containing the PBA of the next available replacement block may be used. Initially the manufacturer may generate the next available replacement block address and store it in the LUT information block 46, from which it may be read and stored in the replacement block address register upon device power-up, and updated during device operation. Available replacement blocks may be determined by any desired convention; illustratively from low-to-high address in the redundant block area 44, followed by from high-to-low address in the user-addressable area 42. Blocks in the user-addressable area 42 may be reserved for replacement block purposes, or each block may be checked to ensure that it is unused before selecting it as "available." The convention may include a limit on the number of blocks in the user-addressable area 42 that may be used for replacement purposes.

With both the LBA of the bad block and the PBA of the replacement block known, both the LUT register 27 and the LUT information block 46 may be updated accordingly (block 640). The updating may be initiated by the address mapping command or the bad block marking command in the illustrative user-controlled process, or by the bad block marking command in the illustrative semi-automatic process, or by the control logic in the illustrative automatic process. Prompt updating of the LUT register 27 is desirable so that subsequent memory accesses are accurate. Reasonably prompt updating of the LUT information block 46 is desirable so that the updated LUT is not lost should power be interrupted. Updating may proceed in any desired manner, such as, for example, independently, or by updating the LUT register 27 first followed by writing of the LUT register 27 to the LUT information block 46.

Data may then be transferred to the replacement block from the bad block (block 650) using any suitable technique. An illustrative suitable technique involves placing two mapping entries in the LUT register 27 for each replacement block, one being the routing of the bad block LBA to the good replacement block in the user addressable area, and the other being the routing of a LBA to the corresponding good replacement block to the corresponding bad block. The later entry provides access to the bad block for transferring data from the bad block to the good replacement block. The transfer may be initiated by the address mapping command or the bad block marking command in the illustrative user-controlled process, or by the bad block marking command in the illustrative semi-automatic process, or by the control logic in the illustrative automatic process. Further processing may then continue (block 660). After the block transfer, access to the bad block may be avoided.

In the case where replacement blocks are selected from the user-addressable area 42, care should be taken so that the user does not access a replacement block for reading, programming or erasure. In the illustrative user-controlled process, the responsibility may be placed on the user who is in control of the mapping. Responsibility may also be placed on the user in the illustrative user-controlled process, provided the user is able to read the LUT register 27 from which the user may determine whether a particular access is to a replacement block. Alternatively, the control logic of the NAND flash memory device may make the determination automatically. In one illustrative technique, before a command is executed, the PBA's in the LUT register 27 are searched for the address or addresses specified in the command. No match indicates that the command may be executed. A match indicates that the user is attempting to access a replacement block directly, and the command should not be executed.

Continuous Read with ECC and Bad Block Management

The phrase "continuous page read" as used herein refers to a type of memory read operation whose purpose is for reading through the whole or a desired portion of the memory array page-by-page, without having to issue a new page read command for every successive page. In the case of the serial NAND Flash device with SPI 20 shown in FIG. 1, for example, the device 20 may be enabled by a CS/ high to low transition, followed by the issuance of a continuous page read command. In this implementation, one issuance of the continuous page read command causes successive pages to be sequentially read and output until the process is stopped. The continuous page read may be stopped in any desired manner. One illustrative technique is to stop the clock signal CLK followed by a low to high transition in CS/ so that the continuous page read is not resumed upon resumption of CLK. Alternatively, the continuous page read command may be designed to stop upon assertion of another signal, after a predetermined or specified number of page reads, or in any other manner desired by the designer.

The page buffer for a NAND memory array may be suitably organized and operated to eliminate gaps and discontinuities in the output data during a continuous page read in accordance with the techniques described in U.S. Pat. No. 8,667,368 issued Mar. 4, 2014 (Gupta et al., Method and Apparatus for Reading NAND Flash Memory), which hereby is incorporated herein in its entirety by reference thereto. The term "addressable continuous page read" used herein corresponds to the term "continuous page read" used in the aforementioned Gupta et al. application, and the term "fast continuous page read" used herein corresponds to the term "modified continuous page read" used in the aforementioned Gupta et al. application. In one suitable approach, the page buffer 38 may be organized in two registers, a data register which receives page data from the NAND memory array, and a cache register which receives data from the data register and is used for ECC and data output operations. The cache register may be organized in two portions, and the page data in the cache register may be output continuously from the cache portions in alternation; for example, portion A may be output, then B, then A, then B, and so forth. ECC computation delay may be eliminated from the output by performing the ECC computation on one cache portion while another is being output. The data register may also be organized in two or more portions corresponding to the cache portions. Page data transfer delay from the data register to the cache register may be eliminated from the output by transferring the page data between the data register portions and the cache register portions in alternation, so that one page data portion is being transferred while another page portion is being output. In this manner, a continuous page read may be performed with ECC and without any gaps or discontinuities in the output between respective portions of the page data or between the page data across pages and blocks.

Advantageously, the incorporation of a fast on-chip LUT register such as the LUT register 27 (FIG. 1) which is locally accessible by control logic such as the control logic 30 (FIG. 1), enables a continuous page read with bad block management from the NAND flash memory without significantly delaying the page read time when a replacement block is encountered, thereby further helping to avoid any gaps or discontinuities across page and block boundaries.

Figure 10:
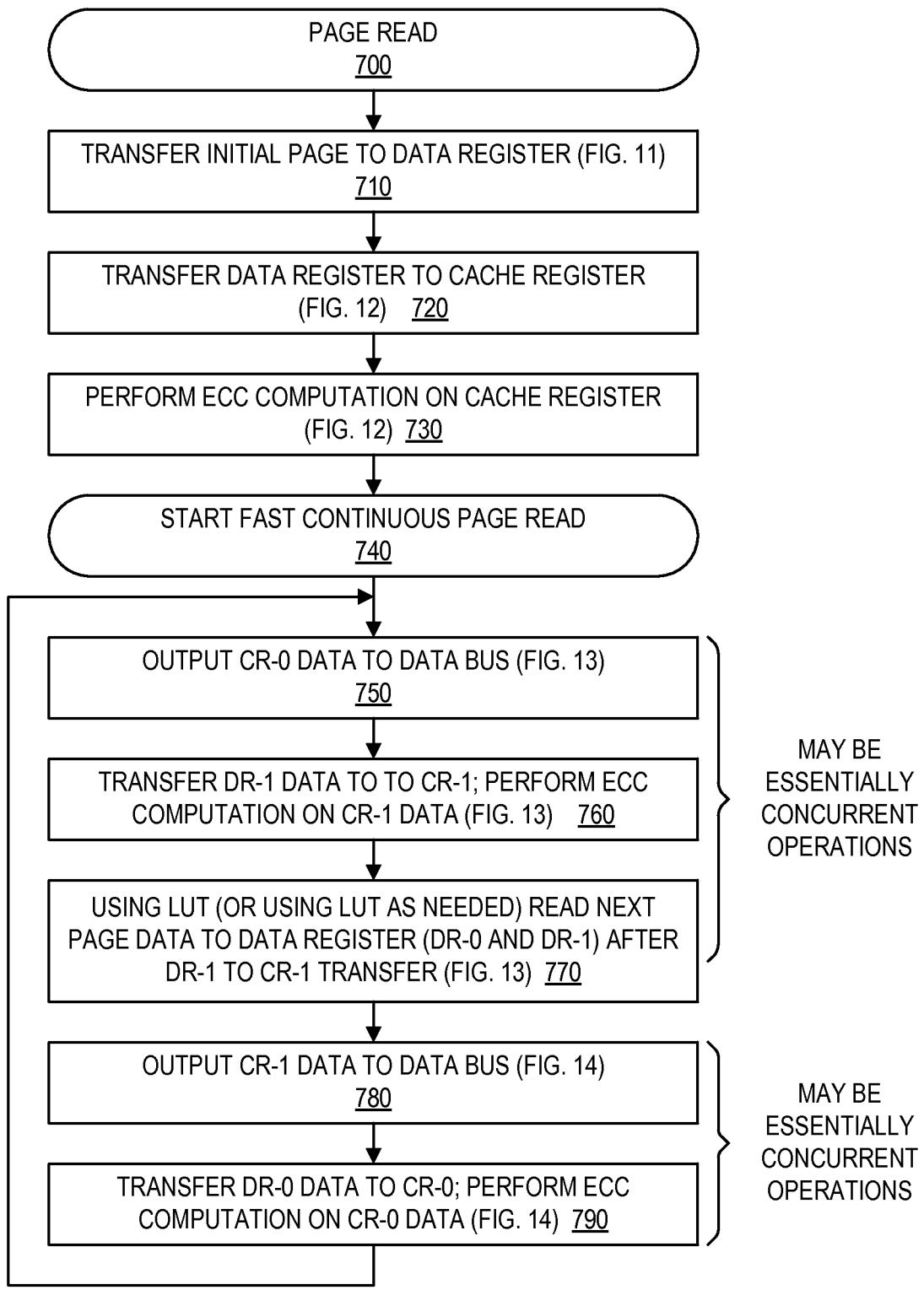
FIG. 10 is a flowchart of a particular implementation of a continuous page read operation with bad block mapping.

FIG. 10 is a flowchart showing a suitable organization and operation of a page buffer to achieve a continuous page read operation with ECC. The various blocks shown in FIG. 10 correlate with various successive operations shown logically in FIGS. 11-14. The time durations specified for various operations shown in FIGS. 11-14 is illustrative, and different time durations may be used depending on various design choices.

FIGS. 11-14 show a data bus 810 and a NAND flash array 850, together with an illustrative implementation of a page buffer which includes a data register 840 that is organized in two portions which may be referred to as data register-0 ("DR-0") and data register-1 ("DR-1"). The page buffer also includes a cache register 830 that is organized in two portions which may be referred to as cache register-0 ("CR-0") and cache register-1 ("CR-1"). Therefore, the page buffer may be thought of as having a portion which includes CR-0 and DR-0, and another portion which includes CR-1 and DR-1. In an illustrative example, the page buffer may have a capacity of 4K Bytes, divided into two equal portions of 2K Byte capacity each. As such, the storage capacity for each of DR-0, DR-1, CR-0, and CR-1 is 1K Byte. DR may be used to refer to a full 2K Byte data register (i.e. DR-0 plus DR-1) and CR may be used to refer to a full 2K Byte cache register (CR-0 plus CR-1). A different size of page buffer may be used and/or a division of the page buffer into two unequal portions may be done if desired. Two sets of control signals may be needed for two portions of the page buffer, unlike one set of control signals needed for an undivided page buffer. Furthermore differences between the logical and physical NAND flash array does not affect teachings herein. For example, the physical array may have two pages (even 2 KB page and odd 2 KB page) on one word line, so that a word line may be 4 KB of NAND bit cells. For clarity, the description and drawings herein are based upon the logical NAND flash array. Furthermore, while the page buffer is organized into 2 portions to support a continuous read operation, the change is transparent to the user. The program operation may be done for standard page size of 2 KB, and standard read operation, e.g. command to read the page data from cache after completing a page read operation, may be also done for standard page size of 2 KB. As such the internal organization of the page buffer into two portions is particularly suitable for the continuous page read operation, and even then is such that its internal division is transparent to the user.

FIGS. 11-14 also illustratively show an error correction circuit 820, which logically may be thought of as having a section ECC-0 which provides error correction of the contents of the cache register portion CR-0, and a section ECC-1 which provides error correction of the contents of the cache register portion CR-1. Various ECC algorithms are suitable for use, including, for example, Hamming ECC algorithm, BCH ECC algorithm, Reed-Solomon ECC algorithm, and others. While two different ECC sections ECC-0 and ECC-1 are shown as respectively interfacing with CR-0 and CR-1 for clarity of explanation, a single ECC block may be used to interface with both CR-0 and CR-1. Using a single ECC block may be advantageous in certain design because of die size saving. On the other hand, if the gate count for the ECC circuit is small, for example on the order of a few hundred gates, so that the area for the ECC block is small (e.g. from about 0.1 mm$^2$ to about 0.2 mm$^2$), the use of two different ECC blocks (e.g. ECC-0 and ECC-1) may be a suitable design choice.

Figure 11:
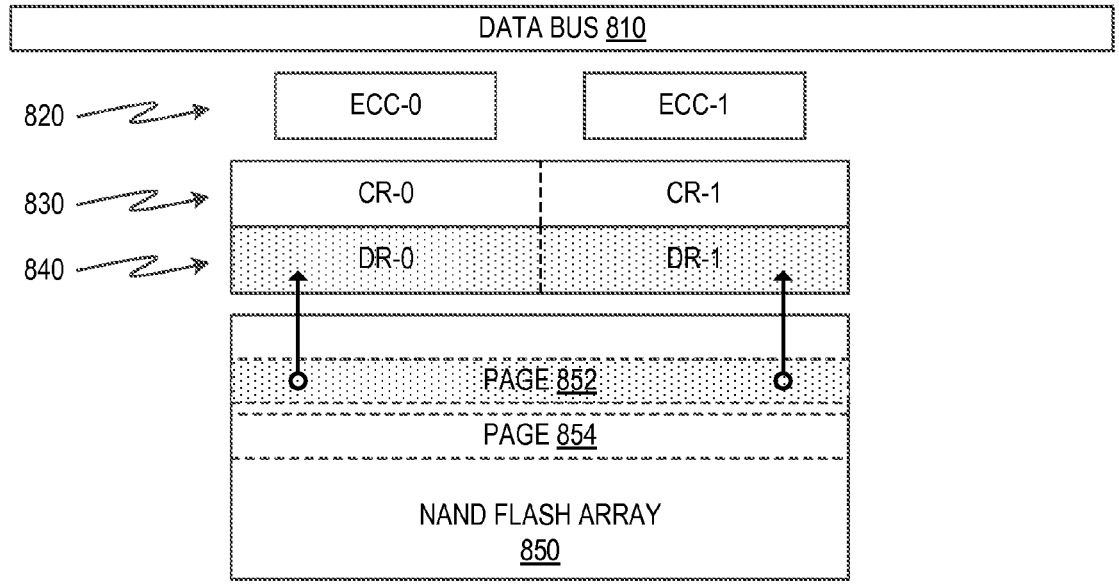
FIG. 11 is a schematic block diagram of a state of operation of a page buffer in accordance with the flowchart of FIG. 10.

The fast continuous read command does not include an address field, but rather relies on a prior command which does include an address field, such as the page read command. As shown in FIG. 10 and FIG. 11, a page read command provides the address of the initial page 852 (block 700), which is read and stored in the data register 840 (block 710). The functional blocks involved in this transfer are shaded with dots for clarity. Illustratively, 2 KB of data is transferred from page 852, which may be considered to be Page-0 of the sequence, into DR-0 and DR-1. Illustratively, the transfer may proceed in one 2 KB transfer, although control of the read transmission gates may be suitably modified so that the read may be done in 1 KB each transfers into DR-0 and DR-1, which may or may not be simultaneous. The time for a page read operation (i.e. time to transfer page data from a NAND flash array to a data register) is illustratively 20 µs, although the exact time may vary depending on such design factors as the sensing circuit, type of cell (single-level cell or multi-level cell), and the technology node (such as 50 nm or 35 nm).

Figure 12:
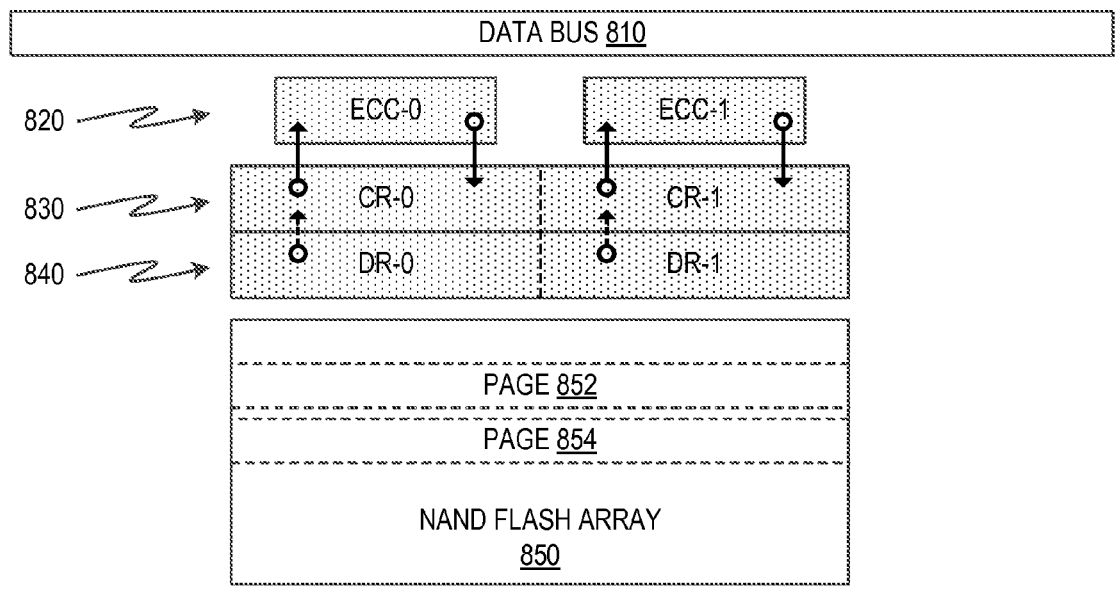
FIG. 12 is a schematic block diagram of a state of operation of a page buffer in accordance with the flowchart of FIG. 10.

Next as shown in FIG. 10 and FIG. 12, the data in the data register 840 is transferred to the cache register 830 (block 720), and an ECC computation is performed on the page data in the cache register 830 (block 730). The time for the transfer from the data register 840 to the cache register 830 varies depending on design choice, but typically ranges from about 1 µs to about 3 µs. The time required for the error correction circuit 820 to complete depends on the choice of ECC algorithm, the internal data bus, the on-chip timing oscillator period, and other design factors. Illustratively, the error correction circuit 820 may complete in about 36 µs, since some physical designs may use one ECC circuit block for both portions CR-0 and CR-1 of the cache register 830, and illustratively error correction for each portion may take 18 µs.

Figure 13:
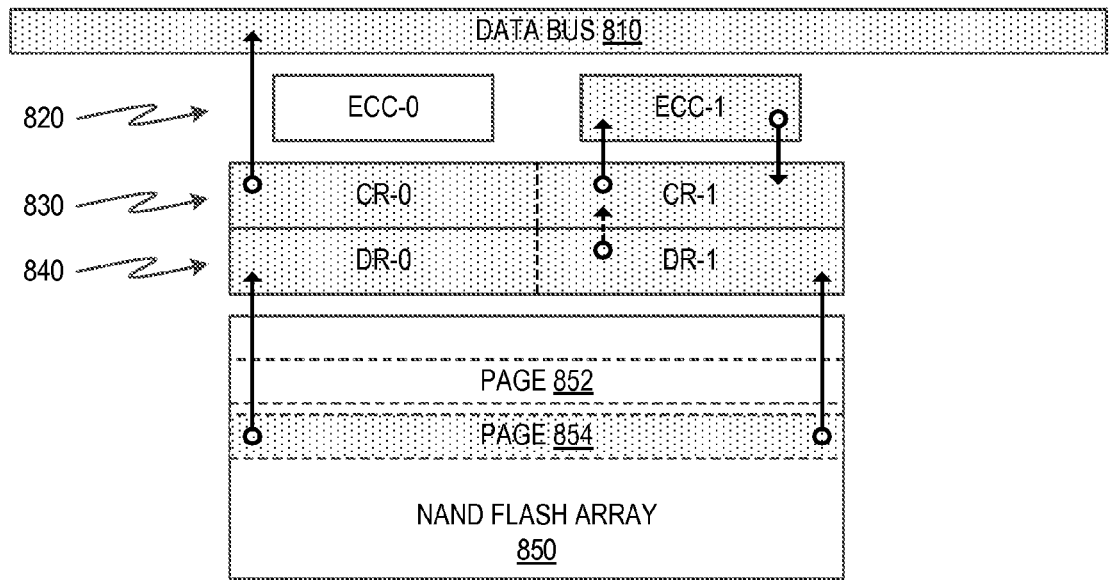
FIG. 13 is a schematic block diagram of a state of operation of a page buffer in accordance with the flowchart of FIG. 10 and the flowchart of FIG. 15.

The page read ends without clocking out data, and the continuous page read command follows (block 740). As shown in FIG. 10 and FIG. 13, various essentially concurrent operations may occur. One such operation involves sending the Page-0 data in the cache register portion CR-0, which has already gone through the ECC computation, to output through the data bus 810 (block 750). While the path from the data bus 810 to an output port is not shown, such paths are well known to a person of ordinary skill in the art.

Another one of the essentially concurrent operations involves transferring the portion of page data in the data register portion DR-1 to the cache register portion CR-1, and performing an ECC computation on the page data portion in the cache register portion CR-1 (block 760). The time for the transfer from DR-1 to CR-1 varies depending on design choices, but typically ranges from about 1 µs to about 3 µs. The time required for the error correction circuit section ECC-1 to complete depends on the choice of ECC algorithm, the internal data bus, the on-chip timing oscillator period, and other design factors. Illustratively, the error correction circuit section ECC-1 may complete in about 12 µs. However, assuming the time for CR-0 data to be sent out to be 20 µs and the time for the DR-1 to CR-1 transfer to be 2 µs, the error correction circuit sections ECC-0 and ECC-1 may each be designed to complete in 18 µs or less.

Another one of the essentially concurrent operations involves reading the next sequential 2 KB page of data 854 (Page-1) from the NAND flash array 850 to the data register portions DR-0 and DR-1 (block 770). The LUT replacement block procedure may be used for each access, or only as needed with the first access and across block boundaries. While much of this transfer is concurrent with the operations shown in block 760, it begins after the DR-1 to CR-1 transfer. Illustratively, the transfer may proceed in one 2 KB transfer, although control of the read transmission gates may be suitably modified so that the read may be done in 1 KB each transfers into DR-0 and DR-1, which may or may not be simultaneous. The time for a page read operation is illustratively 20 µs, although the exact time may vary depending on such design factors as the sensing circuit, type of cell, and the technology node.

While FIG. 13 shows various operations proceeding essentially concurrently, not all operations need to proceed concurrently provided that gaps and other discontinuities in the output data are avoided in accordance with the teachings set forth herein.

Figure 14:
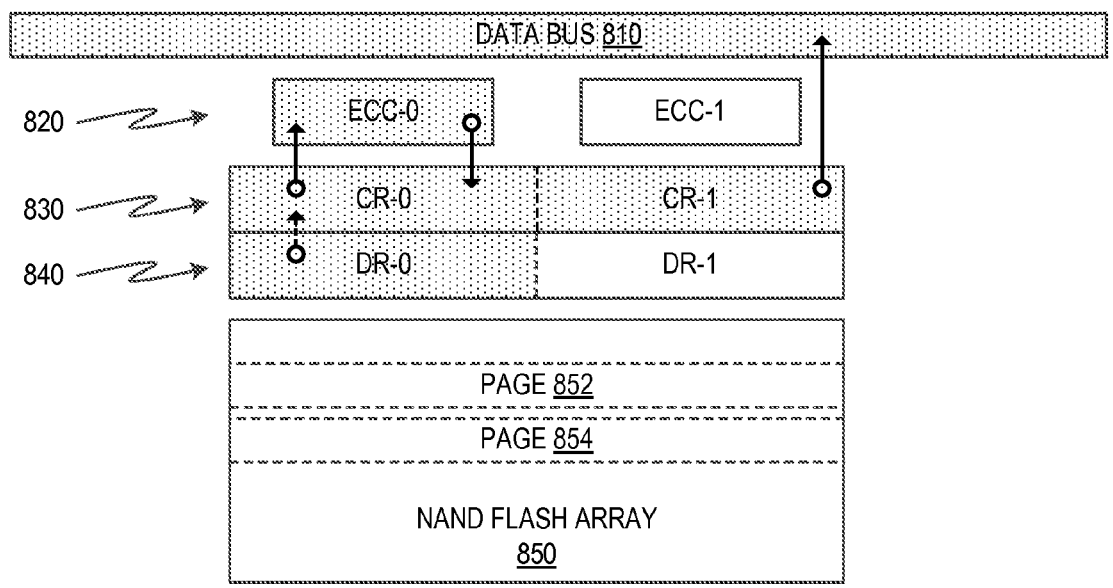
FIG. 14 is a schematic block diagram of a state of operation of a page buffer in accordance with the flowchart of FIG. 10 and the flowchart of FIG. 15.

Next as shown in FIG. 10 and FIG. 14, various essentially concurrent operations may now occur. One such operation involves sending the Page-0 data in the cache register portion CR-1, which has already gone through the ECC computation, to output through the data bus 810 (block 780). Assuming a clock frequency of 100 MHz, the CR-1 data (1 KB) may be sent out in about 20 µs.

Another one of the essentially concurrent operations involves transferring the portion of page data in the data register portion DR-0 to the cache register portion CR-0, and performing an ECC computation on the page data portion in the cache register portion CR-0 (block 790). These operations proceed essentially as described in the text associated with FIG. 13.

While FIG. 14 shows various operations proceeding essentially concurrently so as to eliminate gaps and other discontinuities, such operations need not proceed concurrently if the timings of the operations is prohibitive and some discontinuity in the output is acceptable.

The continuous page read operation continues by looping back to block 750, and may be stopped by stopping the clock and transitioning CS/. Alternatively, the continuous page read command may be varied to stop after a predetermined number of page reads or in any other manner desired by the designer.

Advantageously, the continuous page read command causes reading through the whole or a desired portion of the NAND memory array with no gap or other discontinuity at page or block boundaries. This is achieved by reading data out in a "ping-pong" manner, i.e. reading from CR-0 and CR-1 in alternation. Essentially the operations shown in FIG. 13 and FIG. 14 are repeated until the whole or desired portion of the NAND memory array has been read; specifically, 1 KB data from CR-0 is sent to output, then 1 KB data from CR-1 is sent to output in a seamless manner, then 1 KB data from CR-0 is sent to output in a seamless manner, then 1 KB data from CR-1 sent to output in a seamless manner, and so forth in this ping-pong manner until the user has received the desired data and stops the clock.

Figure 15:
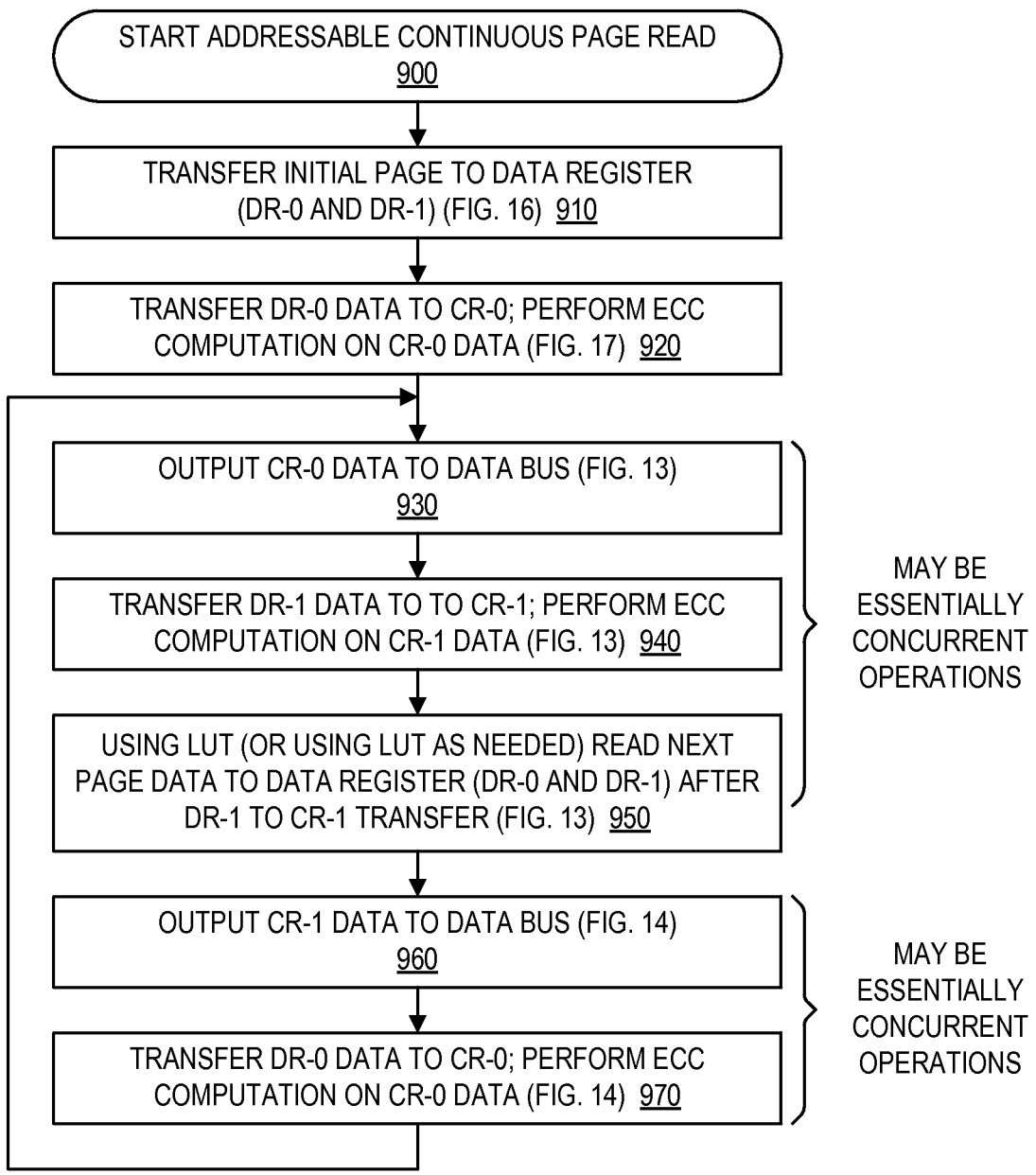
FIG. 15 is a flowchart of a particular implementation of an addressable continuous page read operation with bad block mapping.

FIG. 15 is a flowchart showing a suitable organization and operation of a page buffer to achieve an addressable continuous page read operation with ECC. The various blocks shown in FIG. 15 correlate with various successive operations shown logically in FIGS. 16 and 17 and FIGS. 13 and 14. The time durations specified for various operations shown in FIGS. 16 and 17 and FIGS. 13 and 14 are illustrative, and different time durations may be used depending on various design choices.

Figure 16:
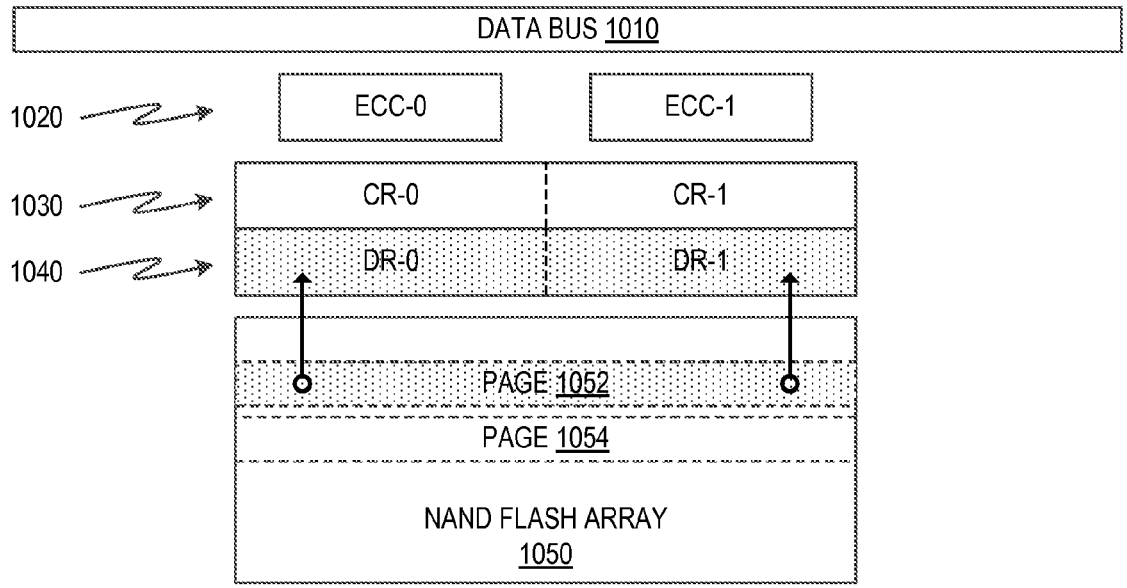
FIG. 16 is a schematic block diagram of a state of operation of a page buffer in accordance with the flowchart of FIG. 15.

As shown in FIG. 15 and FIG. 16, the initial page 1052 (Page-0) which is specified in the addressable continuous page read command is transferred from the NAND flash array 1050 to DR-0 and DR-1 of the data register 1040 (block 910). The functional blocks involved in this transfer are shaded with dots for clarity. Illustratively, 2 KB of data is transferred from page 1052, which is Page-0 of the sequence, into DR-0 and DR-1. Illustratively, the transfer may proceed in one 2 KB transfer, although control of the read transmission gates may be suitably modified so that the read may be done in 1 KB each transfers into DR-0 and DR-1, which may or may not be simultaneous. The time for a page read operation (i.e. time to transfer page data from a NAND flash array to a data register) is illustratively 20 µs, although the exact time may vary depending on such design factors as the sensing circuit, type of cell (single-level cell or multi-level cell), and the technology node (such as 50 nm or 35 nm).

Figure 17:
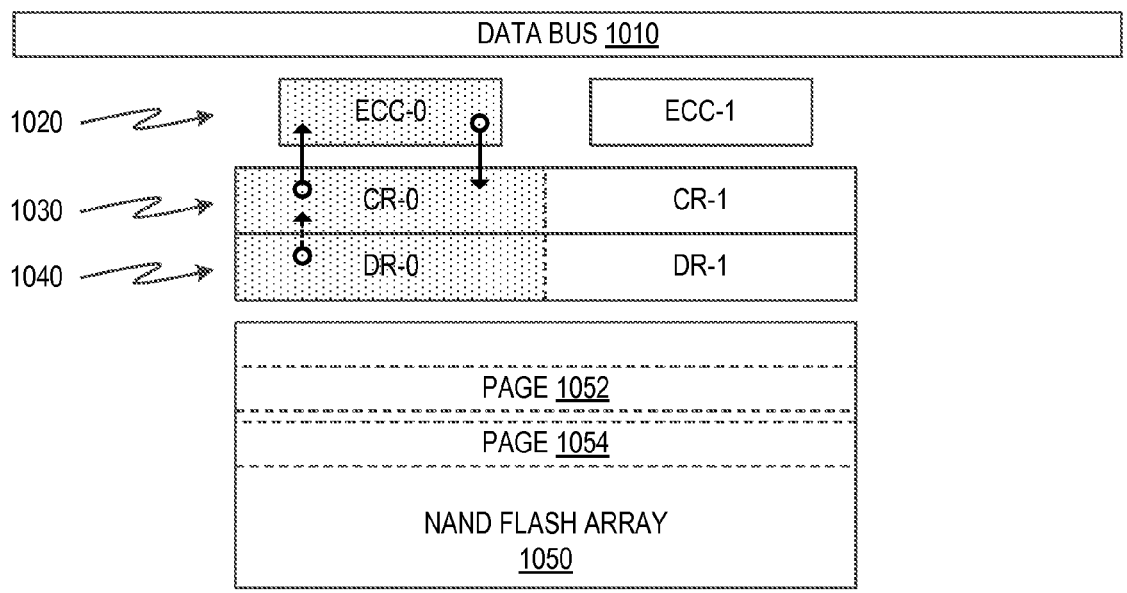
FIG. 17 is a schematic block diagram of a state of operation of a page buffer in accordance with the flowchart of FIG. 15.

Next as shown in FIG. 15 and FIG. 17, a portion of the page data is transferred from data register portion DR-0 to the cache register portion CR-0, and an ECC computation is performed on the page data portion in the cache register portion CR-0 (block 920). The time for the transfer from DR-0 to CR-0 varies depending on design choices, but typically ranges from about 1 µs to about 3 µs. The time required for the error correction circuit section ECC-0 to complete depends on the choice of ECC algorithm, the internal data bus, the on-chip timing oscillator period, and other design factors. Illustratively, the error correction circuit section ECC-0 may complete in about 12 µs. However, assuming the time budget for FIG. 16 to be 20 µs and the time for the DR-0 to CR0 transfer to be 2 µs, the error correction circuit sections ECC-0 and ECC-1 may be designed to complete in 18 µs or less.

The addressable continuous page read operation continues essentially as shown in FIG. 13 and FIG. 14, with blocks 930, 940, 950, 960 and 970 of FIG. 15 generally corresponding to blocks 750, 760, 770, 780 and 790 of FIG. 10. The operations shown in FIG. 16 and FIG. 17 may be considered initial latency, since the data is not ready for sending to output until ECC computation shown in FIG. 17 has been completed. This latency may be about 40 µs. In contrast, the fast continuous page read has no latency, since data may be output immediately after the user provides the command, address, and optional dummy clocks. However, the page read command may require a time to complete that may approach about 60 µs depending on the time required for the ECC processing. In an alternative illustrative technique, a partial initialization command causes a page read into the data register, a transfer of the data from the data register to the cache register, and ECC correction of just one portion of the cache register. The latency introduced by this technique may approach about 40 µs depending on the time required for the ECC processing.

The description of the invention including its applications and advantages as set forth herein is illustrative and is not intended to limit the scope of the invention, which is set forth in the claims. Variations and modifications of the embodiments disclosed herein are possible, and practical alternatives to and equivalents of the various elements of the embodiments would be understood to those of ordinary skill in the art upon study of this patent document. Moreover, specific values given herein are illustrative, and may be varied as desired. These and other variations and modifications of the embodiments disclosed herein, including of the alternatives and equivalents of the various elements of the embodiments, may be made without departing from the scope and spirit of the invention, including the invention as set forth in the following claims.

The invention claimed is:

1. A method of performing a continuous page read operation on a NAND flash memory chip having a NAND flash memory array and a page buffer comprising a data register and a cache register, comprising:

maintaining a look up table register on-chip with the NAND flash memory array, the look up table register storing one or more logical bad block addresses and one or more physical replacement block addresses corresponding to the logical bad block addresses;

outputting data from a plurality of portions of the cache register, in succession and during each clock cycle of a continuously running clock, the data register being organized in a plurality of portions corresponding to the portions of the cache register;

establishing a logical page address for accessing the NAND flash memory array, the logical page address comprising a logical block address portion;

searching within the logical bad block addresses of the look up table register for a match between one of the logical bad block addresses and the logical block address portion;

while outputting data from a first one of the cache register portions, transferring data to a second one of the cache register portions different than the first cache register portion from the corresponding portion of the data register;

while outputting data from the first cache register portion and after the transferring step, performing an error-correction code (ECC) computation on the second cache register portion;

while outputting data from the first cache register portion and after the transferring step, reading a page of data from the NAND flash memory array into the data register using the logical page address when the match is absent from the searching step, and using one of the physical replacement block addresses which corresponds to the one of the logical bad block addresses that matches the logical block address portion when the match is present in the searching step; and while outputting data from the second cache register portion, transferring data to one of the cache register portions other than the second cache register portion from the corresponding portion of the data register and performing an error-correction code (ECC) computation thereon;

wherein the establishing step comprises incrementing the logical page address by one page, further comprising repeating the outputting step, the establishing step, the searching step, the transferring step, the performing step, the reading step, and the transferring and performing step across a block boundary.

2. The method of claim 1 wherein the establishing step comprises incrementing the logical page address by one page, further comprising repeating the outputting step, the establishing step, the transferring step, the performing step, the reading step, and the transferring and performing step across a page boundary.

3. The method of claim 1 wherein the establishing step comprises incrementing the logical page address by one page, further comprising repeating the outputting step, the establishing step, the searching step, the transferring step, the performing step, the reading step, and the transferring and performing step across a page boundary.

4. The method of claim 1 wherein the outputting step commences after an initial latency period comprising time to read a page of data from the NAND flash memory array to the data register.

5. The method of claim 1 wherein the outputting step commences without an initial latency period.

6. A NAND flash memory chip comprising:
a NAND flash memory array;
a row decoder coupled to the NAND flash memory array;
a page buffer coupled to the NAND flash memory array;
a column decoder coupled to the page buffer;
an I/O control circuit coupled to the column decoder;
a status register coupled to the I/O controller;
a continuous page read bad block address register coupled to the I/O controller;
a command register coupled to the I/O controller; an address register coupled to the I/O controller; a look up table register coupled to the I/O controller; and
a control logic circuit coupled to the row decoder, the column decoder, the page buffer, the status register, the continuous page read bad block address register;
the command register;
the address register; and
the look up table register;
wherein the page buffer comprises a data register coupled to the NAND flash memory array, and a cache register coupled to the data register, the column decoder being coupled to the cache register, the cache register being organized in a plurality of portions, and the data register being organized in a plurality of portions respectively corresponding to the cache register portions; and wherein the control logic circuit comprises logic elements for executing the functions of:

maintaining the look up table register, the look up table register storing one or more logical bad block addresses and one or more physical replacement block addresses corresponding to the logical bad block addresses;

outputting data from a plurality of portions of the cache register, in succession and during each clock cycle of a continuously running clock, the data register being organized in a plurality of portions corresponding to the portions of the cache register;

establishing a logical page address for accessing the NAND flash memory array, the logical page address comprising a logical block address portion;

searching within the logical bad block addresses of the look up table register for a match between one of the logical bad block addresses and the logical block address portion;

while outputting data from a first one of the cache register portions, transferring data to a second one of the cache register portions different than the first cache register portion from the corresponding portion of the data register;

while outputting data from the first cache register portion and after the transferring function, performing an error-correction code (ECC) computation on the second cache register portion;

while outputting data from the first cache register portion and after the transferring function, reading a page of data from the NAND flash memory array into the data register using the logical page address when the match is absent from the searching function, and using one of the physical replacement block addresses which corresponds to the one of the logical bad block addresses that matches the logical block address portion when the match is present in the searching function; and while outputting data from the second cache register portion, transferring data to one of the cache register portions other than the second cache register portion from the corresponding portion of the data register and performing an error-correction code (ECC) computation thereon;

wherein the establishing function comprises incrementing the logical page address by one page, further comprising repeating the outputting function, the establishing function, the searching function, the transferring function, the performing function, the reading function, and the transferring and performing function across a block boundary.

* * * * *